(12) United States Patent
Yamazaki et al.

(10) Patent No.: US 7,495,836 B2
(45) Date of Patent: Feb. 24, 2009

(54) DISPLAY DEVICE

(75) Inventors: Shoichi Yamazaki, Yokohama (JP); Takeshi Nishimura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/928,518

(22) Filed: Oct. 30, 2007

(65) Prior Publication Data

US 2008/0094720 A1    Apr. 24, 2008

Related U.S. Application Data

(60) Division of application No. 11/766,294, filed on Jun. 21, 2007, which is a division of application No. 08/959,285, filed on Oct. 24, 1997, now Pat. No. 7,262,919, which is a continuation of application No. 08/478,688, filed on Jun. 7, 1995, now abandoned.

(30) Foreign Application Priority Data

| Jun. 13, 1994 | (JP) | 6-130301 |
| Aug. 5, 1994 | (JP) | 6-204268 |
| Dec. 22, 1994 | (JP) | 6-336063 |

(51) Int. Cl.
    *G02B 27/14* (2006.01)
(52) U.S. Cl. .......... 359/631; 359/633; 359/638
(58) Field of Classification Search .......... 359/630, 359/631, 633, 638, 640
    See application file for complete search history.

(56) References Cited

U.S. PATENT DOCUMENTS

| 3,583,790 A | 6/1971 | Baker | 350/184 |
| RE27,356 E | 5/1972 | La Russa | 350/157 |
| 3,697,154 A | 10/1972 | Johnson | 350/174 |
| 4,026,641 A | 5/1977 | Bosserman et al. | 350/298 |
| 4,081,209 A | 3/1978 | Heller et al. | 350/174 |
| 4,322,135 A | 3/1982 | Freeman | 350/410 |
| 4,563,061 A | 1/1986 | Ellis | 350/503 |
| 4,650,292 A | 3/1987 | Baker et al. | 350/432 |
| 4,669,810 A | 6/1987 | Wood | 350/3.7 |

(Continued)

FOREIGN PATENT DOCUMENTS

EP          0 380 035          8/1990

(Continued)

OTHER PUBLICATIONS

Sep. 26, 1996 European Search Report in European Patent Appln. No. 95109058.

(Continued)

*Primary Examiner*—Jordan M. Schwartz
(74) *Attorney, Agent, or Firm*—Fitzpatrick, Cella, Harper & Scinto

(57) ABSTRACT

A display device for displaying information is provided with an optical system for guiding the light of the display device to the eye, the optical system having, in the order in the proceeding direction of the light, an entrance face for receiving the light, a curved face for totally reflecting the light and a reflecting face concave to the eye side and adapted to reflect the light toward the eye. The reflected light is transmitted by the curved face and reaches the eye. Thus there is obtained a compact display device with satisfactorily suppressed aberrations.

4 Claims, 19 Drawing Sheets

U.S. PATENT DOCUMENTS

| | | | | |
|---|---|---|---|---|
| 4,775,217 A | | 10/1988 | Ellis | 350/538 |
| 4,874,214 A | | 10/1989 | Cheysson et al. | 350/3.7 |
| 4,969,724 A | | 11/1990 | Ellis | 350/503 |
| 5,000,544 A | | 3/1991 | Staveley | 350/174 |
| 5,006,072 A | | 4/1991 | Letovsky | 434/61 |
| 5,050,962 A | | 9/1991 | Monnier et al. | 359/13 |
| 5,093,567 A | | 3/1992 | Staveley | 250/221 |
| 5,121,099 A | * | 6/1992 | Hegg et al. | 340/461 |
| 5,134,521 A | | 7/1992 | LaCroix et al. | 359/631 |
| 5,276,471 A | | 1/1994 | Yamauchi et al. | 351/153 |
| 5,384,654 A | | 1/1995 | Iba | 359/364 |
| 5,416,876 A | | 5/1995 | Ansley | 385/116 |
| 5,430,634 A | | 7/1995 | Baker et al. | 362/32 |
| 5,436,763 A | | 7/1995 | Chen et al. | 359/565 |
| 5,436,765 A | | 7/1995 | Togino | 359/631 |
| 5,459,612 A | | 10/1995 | Ingleton | 359/630 |
| 5,479,224 A | | 12/1995 | Yasugaki | 353/101 |
| 5,483,307 A | | 1/1996 | Anderson | 353/98 |
| 5,486,841 A | | 1/1996 | Hara et al. | 345/8 |
| 5,506,728 A | | 4/1996 | Edwards et al. | 359/629 |
| 5,513,041 A | | 4/1996 | Togino | 359/631 |
| 5,539,422 A | | 7/1996 | Heacock et al. | 345/8 |
| 5,546,227 A | | 8/1996 | Yasugaki et al. | 359/630 |
| 5,594,588 A | | 1/1997 | Togino | 359/631 |
| 5,596,433 A | | 1/1997 | Konuma | 359/631 |
| 5,598,248 A | | 1/1997 | Nagano et al. | 396/51 |
| 5,619,377 A | | 4/1997 | Rallison | 359/631 |
| 5,640,632 A | | 6/1997 | Koyama et al. | 396/382 |
| 5,654,827 A | | 8/1997 | Reichert | 359/631 |
| 5,663,833 A | | 9/1997 | Nanba et al. | 359/631 |
| 5,671,062 A | | 9/1997 | Nakamura | 359/687 |
| 5,699,194 A | | 12/1997 | Takahashi | 359/633 |
| 5,701,202 A | | 12/1997 | Takahashi | 359/631 |
| 5,734,505 A | | 3/1998 | Togino et al. | 359/631 |
| 5,754,336 A | | 5/1998 | Kanai | 359/431 |
| 5,760,931 A | * | 6/1998 | Saburi et al. | 359/13 |
| 5,768,024 A | | 6/1998 | Takahashi | 359/631 |
| 5,790,312 A | | 8/1998 | Togino | 359/631 |
| 5,793,339 A | * | 8/1998 | Takahashi | 345/7 |
| 5,836,667 A | | 11/1998 | Baker et al. | 362/32 |
| 5,838,504 A | | 11/1998 | Ichikawa et al. | 359/834 |
| 5,875,056 A | | 2/1999 | Takahashi | 359/633 |
| 5,880,888 A | | 3/1999 | Schoenmakers et al. | 359/631 |
| 5,917,656 A | | 6/1999 | Hayakawa et al. | 359/637 |
| 5,936,773 A | | 8/1999 | Togino | 359/630 |
| 6,018,423 A | | 1/2000 | Takahashi | 359/633 |
| 6,084,715 A | | 7/2000 | Aoki et al. | 359/627 |
| 6,195,207 B1 | | 2/2001 | Takahashi | 359/627 |
| RE37,175 E | | 5/2001 | Takahashi | 359/631 |
| RE37,292 E | | 7/2001 | Togino et al. | 359/633 |
| 6,317,267 B1 | | 11/2001 | Takahashi | 359/631 |
| 6,532,116 B1 | | 3/2003 | Yamazaki | 359/728 |
| 6,636,185 B1 | | 10/2003 | Spitzer et al. | 345/8 |
| 7,253,960 B2 | | 8/2007 | Yamazaki et al. | 359/633 |
| 7,262,919 B1 | | 8/2007 | Yamazaki et al. | 359/631 |
| 2007/0171532 A1 | | 7/2007 | Yamazaki | 359/630 |

FOREIGN PATENT DOCUMENTS

| | | |
|---|---|---|
| EP | 0 408 344 | 1/1991 |
| EP | 0 556 598 | 8/1993 |
| EP | 0 583 116 | 2/1994 |
| EP | 0 618 471 | 10/1994 |
| GB | 1578136 | 11/1980 |
| GB | 2246900 | 2/1992 |
| JP | 58-78116 | 5/1983 |
| JP | 62-214782 | 9/1987 |
| JP | 1-274736 | 11/1989 |
| JP | 2-297516 | 12/1990 |
| JP | 3-101709 | 4/1991 |
| JP | 3-109029 | 5/1991 |
| JP | 4-23581 | 1/1992 |
| JP | 4-242630 | 8/1992 |
| JP | 4-343313 | 11/1992 |
| JP | 5-19130 B2 | 3/1993 |
| JP | 5-303056 | 11/1993 |
| JP | 7-191274 | 7/1995 |
| JP | 8-248481 | 9/1996 |

OTHER PUBLICATIONS

Jan. 23, 1997 European Search Report in European Patent Appln. No. 95109088.

Official Action in Invalidation Appeal against Japanese Patent No. 2911750 (with partial translation).

* cited by examiner (5 : FULL SIZE)

DISPLAY DEVICE

This application is a division of application Ser. No. 11/766,294 filed Jun. 21, 2007, which is a division of application Ser. No. 08/959,285 filed Oct. 24, 1997, U.S. Pat. No. 7,262,919 B1, which is a continuation of application Ser. No. 08/478,688 filed Jun. 7, 1995, now abandoned.

BACKGROUND OF THE INVENTION

1. Field of the Invention

The present invention relates to an observation optical system, and more particularly to an optical system adapted for use in a device called head-up display or spectacle-type display.

2. Related Background Art

Conventionally there have been proposed display devices in which a cathode ray tube (CRT) or a liquid crystal display (LCD) is positioned close to the head of the observer whereby the observer is enabled to observe the image formed by such CRT or LCD, as disclosed for example in U.S. Pat. Nos. 4,081,209 and 4,969,724 and Japanese Patent Laid-Open Application Nos. 58-78116, 2-297516 and 3-101709. Japanese Patent Laid-Open Application No. 3-101709 discloses an observation device providing a relatively easily observable real image by re-focusing an original image. However, a considerably large space is unavoidable because an optical lens is employed for re-imaging.

On the other hand, U.S. Pat. Nos. 4,081,209 and 4,969,724 and Japanese Patent Laid-Open Application Nos. 58-78116 and 2-297516 disclose observation devices designed to observe a false image which is advantageous for compactizing the device though it is somewhat inferior in the ease of observation.

Though the observation device of the latter type can achieve compactization in comparison with that of the real image type, the extent of such compactization cannot be said sufficient. Among the above-mentioned prior technologies, the one disclosed in the Japanese Patent Laid-Open Application No. 58-78116 is relatively advanced in terms of compactization, but the device still has a large thickness in the direction of the axis of the eye. It is also described that the observed image involves optical distortion, astigmatism and coma. A related technology is also described in U.S. patent application Ser. No. 08/317,528 filed Oct. 4, 1994.

SUMMARY OF THE INVENTION

In consideration of the foregoing, an object of the present invention is to provide a compact and thin observation optical system.

Another object of the present invention is to provide an observation optical system with reduced aberrations.

The above-mentioned objects can be attained, according to an aspect of the present invention, by a display device comprising display means for displaying information, and optical means provided with curved faces for guiding the light from said display means to the eye, wherein said optical means has, in succession in the proceeding direction of the eye, a light entrance face for introducing the light, a curved face for totally reflecting the light and a face concave to the eye for reflecting the light toward the eye whereby the light reaches the eye by way of these curved faces and a compact display device can be attained with satisfactorily suppressed aberrations.

Still another object of the present invention is to provide the above-mentioned display device with a visual axis detecting device thereby controlling the display state of said display means.

Still other objects of the present invention, and the features thereof, will become fully apparent from the following description of the embodiments.

DETAILED DESCRIPTION OF THE PREFERRED EMBODIMENTS

Figure 6:
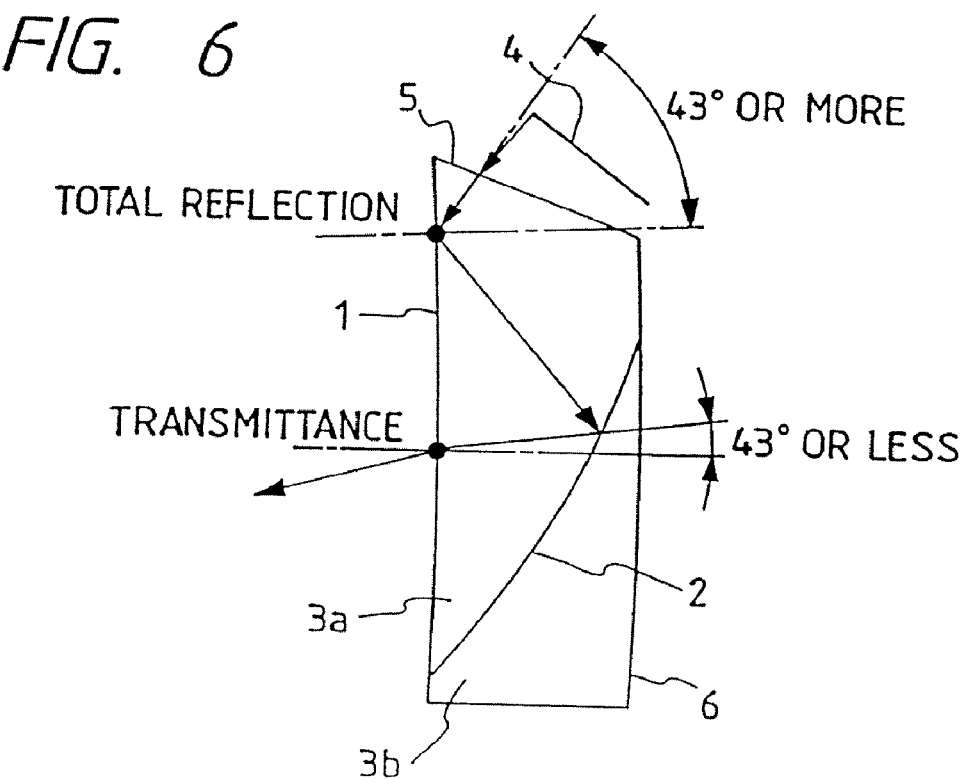
FIGS. 6 and 7 are optical cross-sectional views showing the basic principle of the observation optical system of the present invention.

At first there will be explained the basic principle of the display optical system of the present invention, with reference to FIGS. 1A, 1B and 6. Display means 4, for displaying an original image such as a character or a pattern, is composed for example of a known liquid crystal display (LCD) device. There are also provided a first optical member 3a for guiding the light from the display means 4 to the eye of the observer, and a second optical member 3b. The light from the display means 4 at first enters the first optical member 3a, then is totally reflected by a totally reflecting face 1, at the eye side, of the first optical member, further reflected by a concave half mirror 2, concave to the eye of the observer, transmitted by the above-mentioned totally reflecting face 1 and guided to the eye.

Figure 1A:
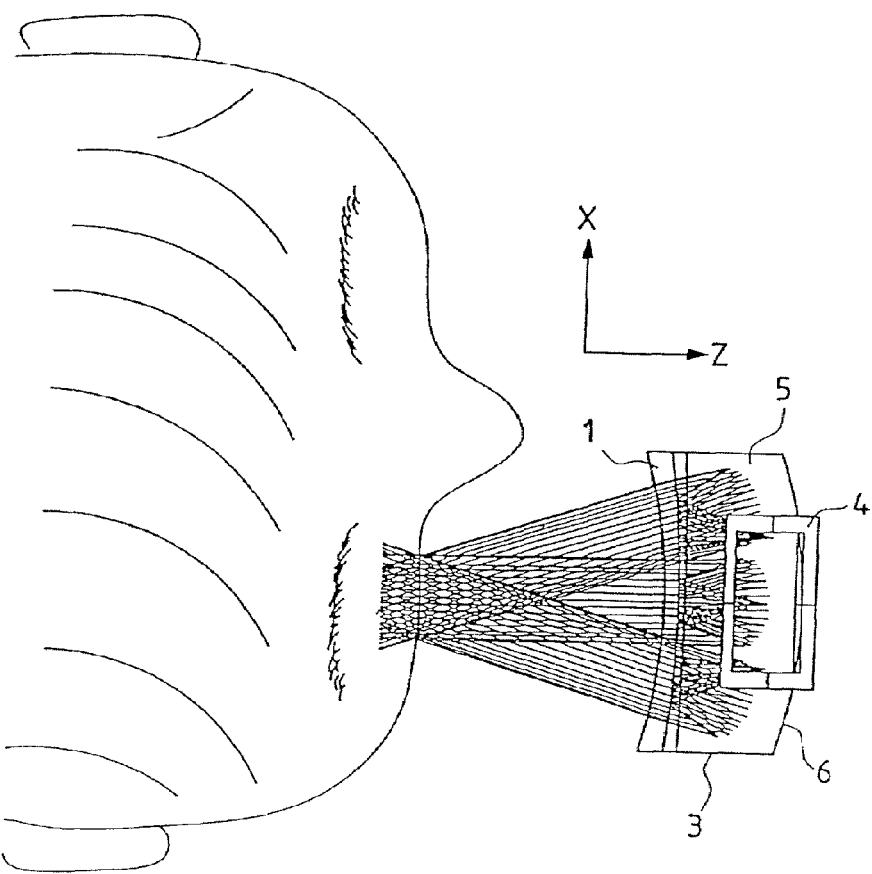
FIGS. 1A and 1B are views showing optical paths in the observation optical system of the present invention.
Figure 1B:
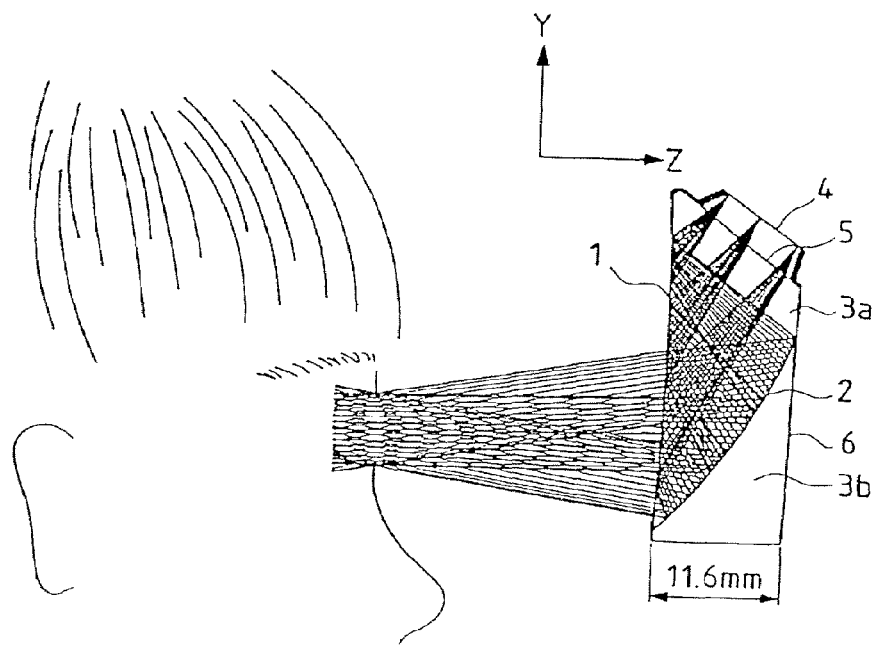
Figure 2A:
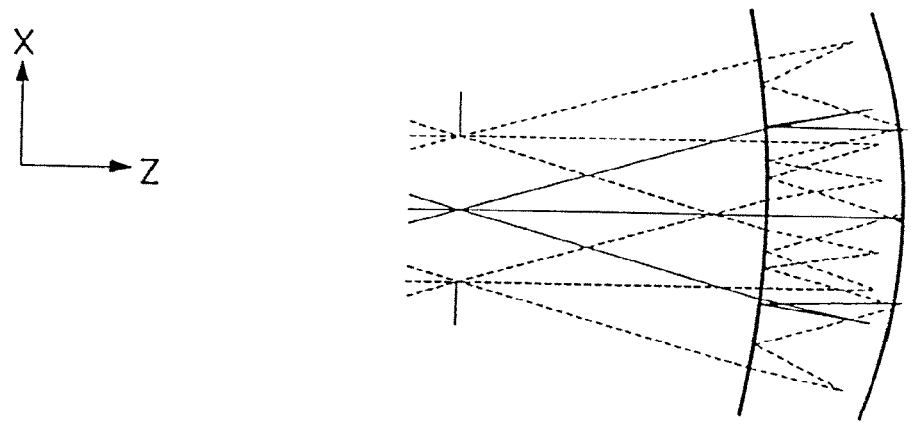
FIGS. 2A and 2B are views showing a cross section and optical paths in the observation optical system of a numerical example 1 of the present invention.
Figure 2B:
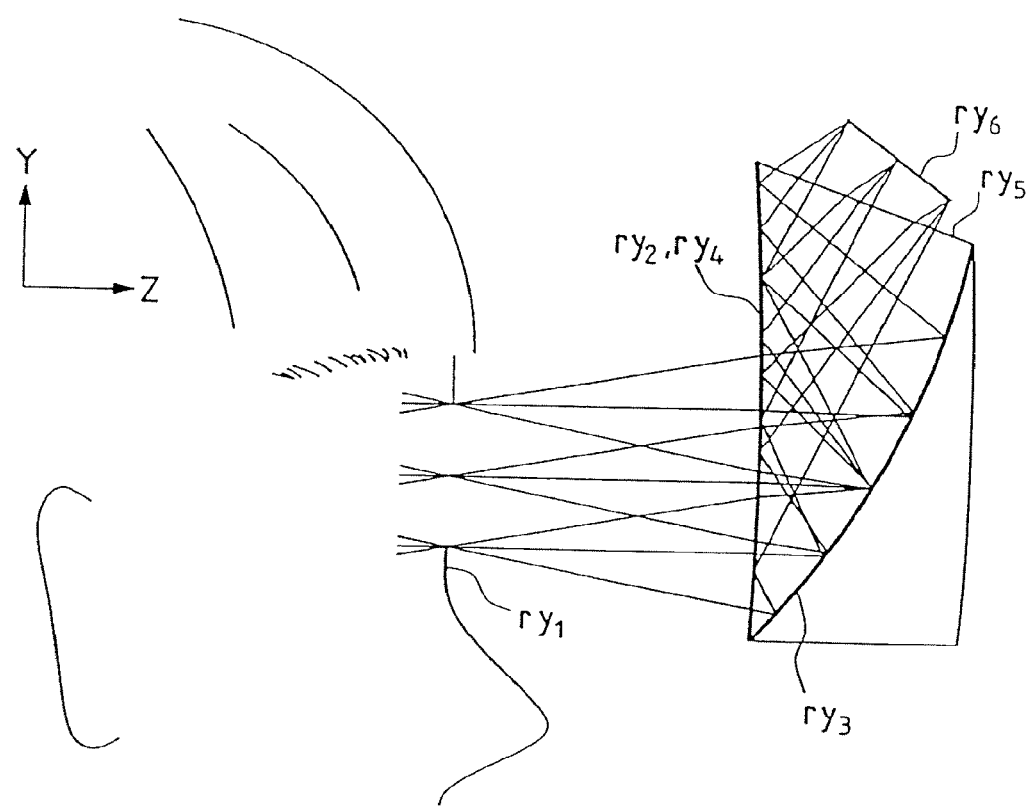
Figure 3A:
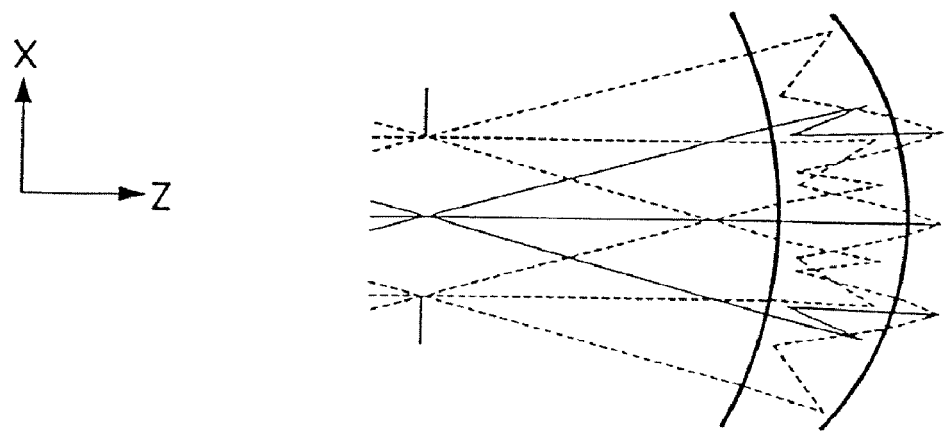
FIGS. 3A and 3B are views showing a cross section and optical paths in the observation optical system of a numerical example 2 of the present invention.
Figure 3B:
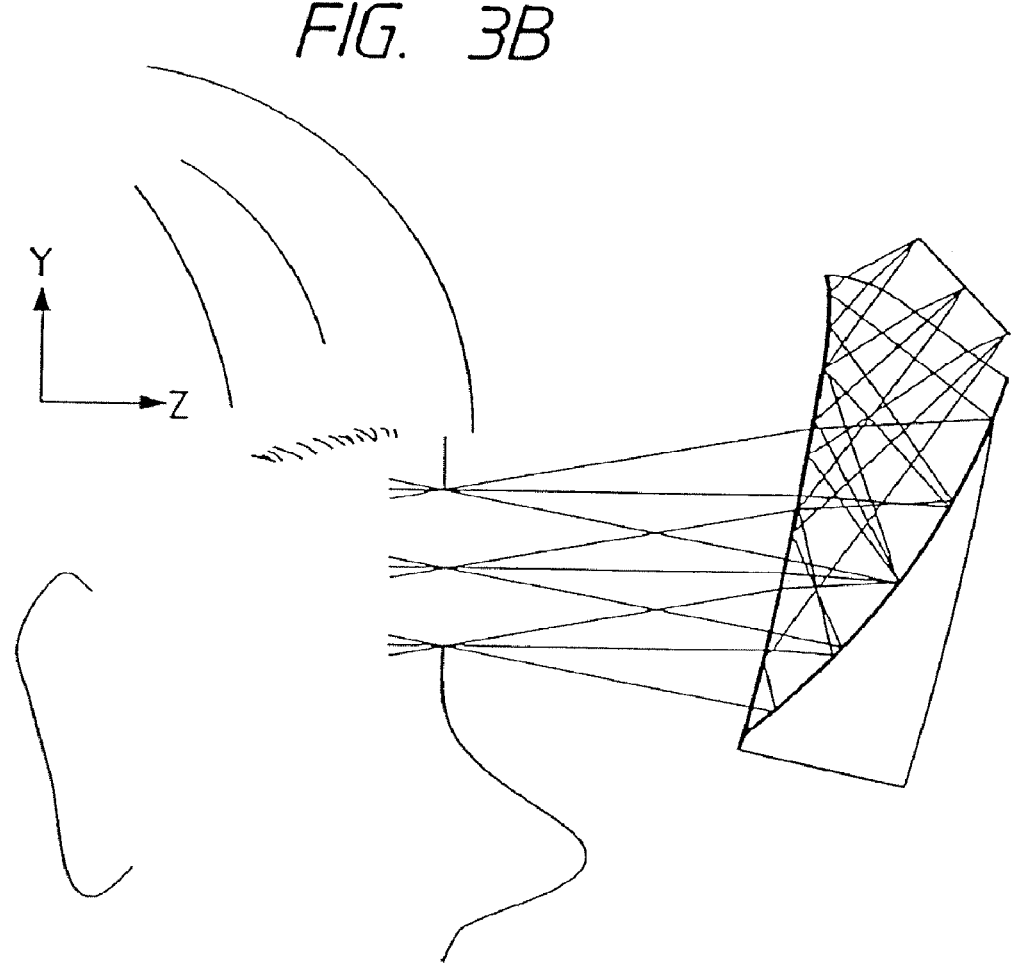
Figure 4A:
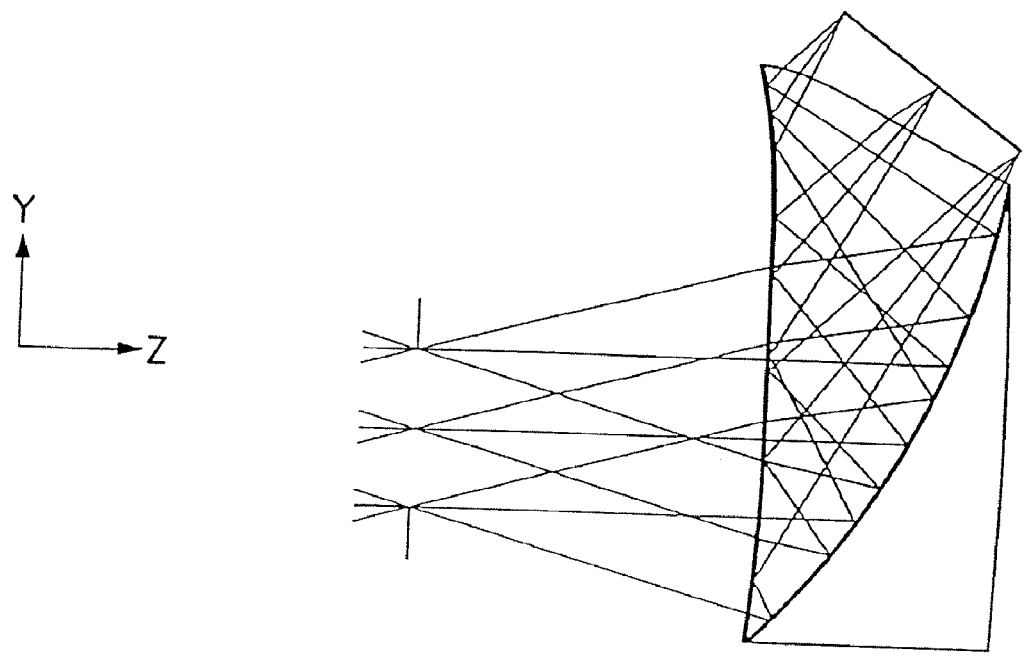
FIGS. 4A and 4B are views showing a cross section and optical paths in the observation optical system of a numerical example 3 of the present invention.
Figure 4B:
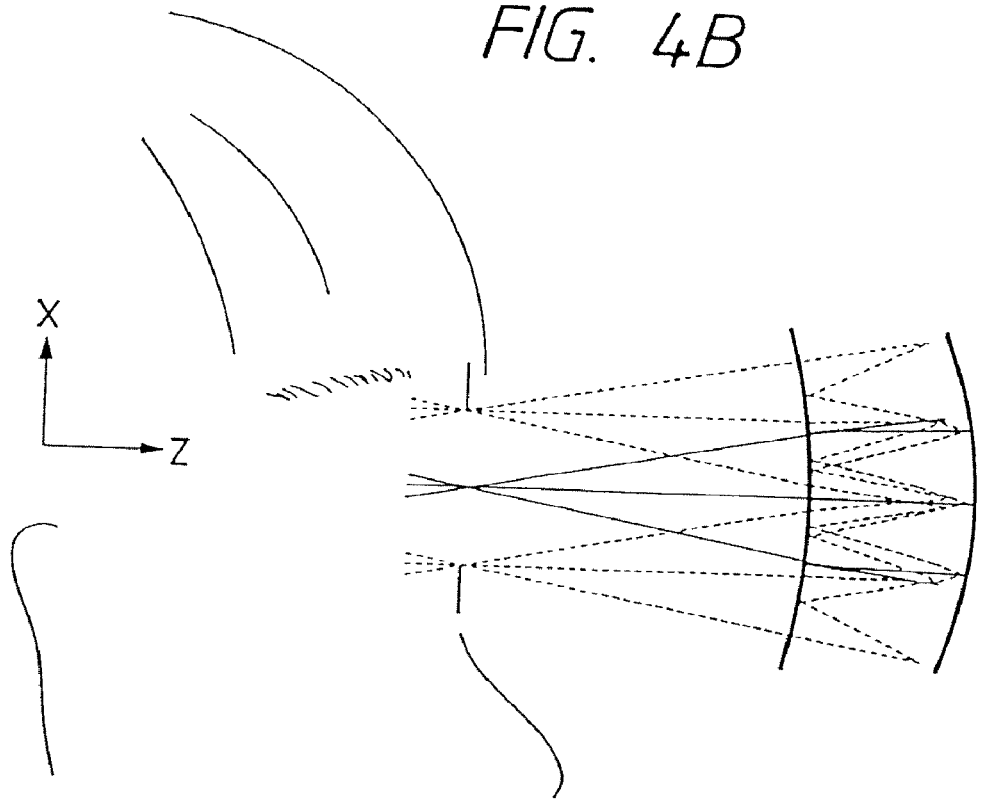
Figure 5A:
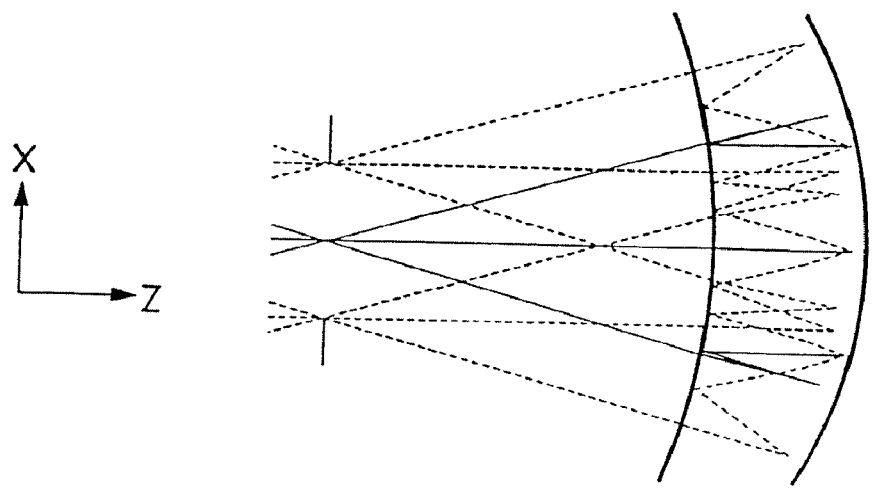
FIGS. 5A and 5B are views showing a cross section and optical paths in the observation optical system of a numerical example 4 of the present invention.
Figure 5B:
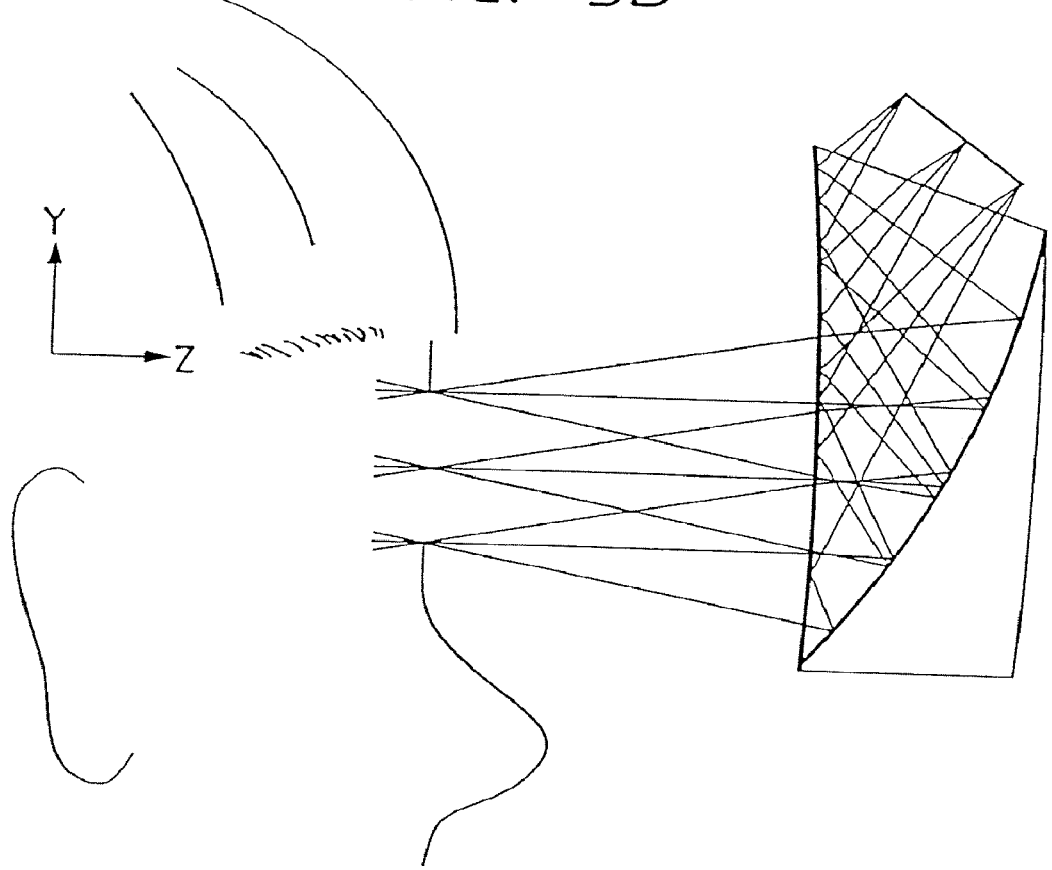

FIGS. 1A and 1B illustrate the optical path, seen respectively from the top and from the side.

As the concave mirror 2 is composed of a half mirror, the observer can observe the image on the display means 4, superimposed with the external scenery. Although the present embodiment provides a superimposing device, there may also be provided a device for merely observing the image display, in which case the concave mirror is composed of a mirror.

Owing to the above-explained configuration, the present and ensuing embodiments provide extremely thin, compact display devices, with a thickness of the optical system in the order of 10 to 15 mm. Also there is achieved a wide viewing angle of ca. ±16.8° in the horizontal direction and ca. ±11.4° in the vertical direction.

Such compactization, wide viewing angle and satisfactory optical performance are derived in the present embodiment from fact that a face at the observer side is utilized as a totally reflecting face and a transmitting face, and that the concave mirror 2 is positioned considerably eccentric with respect to the optical axis of the eye. In addition there are significant contributions from facts that the totally reflecting face is constituted by a curved surface, particularly with optical power variable depending on the azimuthal angle as will be shown in the following numerical examples, and that the concave mirror 2 is given an optical power depending on the azimuthal angle.

In particular, the optical power depending on the azimuthal angle, given to the concave mirror 2, allows to sufficiently eliminate the eccentric aberration resulting from the eccentric positioning thereof. Also the totally reflecting face is similarly constituted by a curved surface to correct the aberrations generated by the concave mirror.

In the following description, the folding direction of the light will be called the direction of generatrix, while a direction perpendicular thereto will be called the direction of meridian. In the present embodiment, the image angle is made wider in the meridian direction, and a relatively strong positive refractive power of the concave mirror generates aberrations, but the totally reflecting face is given, in the cross section along the meridian direction, a negative optical power to correct such aberrations. Along the optical path in the cross section in the meridian direction from the side of the display device or the side of the eye of the observer, there are provided, in succession of a face of a negative refractive power, a face of a positive refractive power (concave mirror) and a face of a negative refractive power, so that the aberrations are easy to eliminate because of such symmetrical arrangement of the refractive powers.

For reducing the thickness in the direction of optical axis of the eye, the elements are desirably so arranged that the optical system 3 stands upright. More specifically, referring to FIG. 7, there is preferably satisfied a condition:

$$|\alpha| \leq 20°$$

wherein α is the angle (tilt angle) of the tangential line to the totally reflecting face 1 at the vertex thereof, to a line perpendicular to the optical axis of the eye. Outside this range, the optical system becomes thicker in the direction of the optical axis, whereby the device becomes bulkier. Also in case of superimposing an image on the scenery, the inclination of the optical member becomes larger to cause a distortion in the observed scenery.

More preferably there is satisfied a condition:

$$-15° \leq \alpha \leq 5°$$

Below the lower limit, the optical system can be made thinner in a direction parallel to the optical axis of the eye, but the distortion becomes severer. Above the upper limit, the optical system becomes thicker in a direction parallel to the optical axis of the eye, and the prisms become undesirably heavy.

In the present embodiment, since the totally reflecting face is concave to the eye, the light entrance face at the outside is constituted by a substantially same curved surface in order to prevent the distortion in the observed scenery.

The concave mirror 2 is made considerably eccentric with respect to the optical axis of the eye, whereby an eccentric aberration is generated. However this eccentric aberration is satisfactorily corrected by constituting the totally reflecting face with a curved surface and employing, in the concave mirror 2, a surface of which curvature varies depending on the azimuthal angle (toric or anamorphic surface). Preferably an aspherical surface (toric aspherical or anamorphic aspherical surface) to attain an extremely satisfactory optical performance.

With respect to the generatrix direction (y-direction) which is the direction of folding of the light and the meridian direction perpendicular thereto, the faces of the optical system are so designed to have optical powers variable depending on the azimuthal angle, but, in the entire system, the paraxial focal length is preferably substantially constant in any direction. More specifically, there is preferably satisfied a condition:

$$0.9 < |f_y/f_x| < 1.1$$

wherein $f_y$ and $f_x$ are paraxial focal lengths of the entire system respectively along the cross section in the direction of generatrix and that in the direction of meridian.

Also the totally reflecting face (or transmitting face) or the concave mirror is so designed, as explained in the foregoing, as to vary the optical power depending on the azimuthal angle thereby suppressing the eccentric aberration, and, for this purpose, there is preferably satisfied a condition:

$$|r_x| < |r_y|$$

wherein $r_y$ and $r_x$ are radii of paraxial curvature of said face respectively in the cross section in the generatrix direction and in that in the meridian direction.

In the present embodiment, for achieving compact configuration, the concave mirror 2 is significantly tilted (decentralized) in the direction of generatrix which is the direction of folding of the light, the eccentric aberration is generated larger in the direction of generatrix than in the direction of meridian. Thus the optical power in the cross section in the direction of generatrix is made weaker than that in the cross section in the direction of meridian, namely the radius of paraxial curvature is made longer in the direction of generatrix as indicated in the foregoing condition, thereby suppressing the eccentric aberration in the direction of generatrix.

Preferably these curvatures are so selected as to satisfy:

$$|r_x/r_y| < 0.85$$

Outside this range, the eccentric aberration becomes conspicuously large.

On the other hand, in case the entrance face 5 is so constructed as to have varying optical power depending on the azimuthal angle as in the following numerical examples 2 to 4, the eccentric aberration can be suppressed by inversely satisfying a condition:

$$|r_x|>|r_y|$$

For further satisfactory correction of aberrations, there are preferably satisfied conditions:

$$-2.0<2f_x/r_{x2}<-0.1 \quad (a)$$

$$-2.5<2f_x/r_{x3}<-0.5 \quad (b)$$

wherein $r_{x2}$ and $r_{x3}$ are radii of paraxial curvature respectively of the totally reflecting face (or transmitting face) 1 and the concave mirror 2, in the cross section in the meridian direction.

Below the lower limit of the condition (a), the curvature (negative power) of the totally reflecting face in the meridian direction becomes stronger and the correction of distortion becomes difficult. Also below the lower limit of the condition (b), the curvature (positive power) of the concave mirror in the meridian direction becomes strong and the correction of astigmatism becomes difficult. On the other hand, above the upper limit of the condition (a), the curvature of the totally reflecting face in the meridian direction comes to have a positive power, so that the totally reflecting condition becomes difficult to satisfy. Also above the upper limit of the condition (b), the positive power of the concave mirror in the meridian direction becomes weaker, so that the thickness of the optical system in a direction parallel to the optical axis of the eye becomes undesirably large.

Furthermore, there are preferably satisfied conditions:

$$-1.0<2f_y/r_{y2}<0 \quad (c)$$

$$-2.5<2f_y/r_{y3}<-0.2 \quad (d)$$

wherein $f_y$ is the focal length of the entire system in the generatrix direction, $r_{y2}$ is the radius of curvature of the totally reflecting face, and $r_{y3}$ is the radius of curvature of the concave mirror.

Below the lower limit of the condition (c), the negative power of the totally reflecting face in the generatrix direction becomes stronger, so that the eccentric distortion becomes difficult to correct. Below the lower limit of the condition (d), the positive power of the concave mirror in the generatrix direction becomes stronger, thereby generating a large eccentric astigmatism. Also above the upper limit of the condition (c) relating to the totally reflecting condition in the generatrix direction, it becomes difficult to satisfy the totally reflecting condition. Also above the upper limit of the condition (d) relating to the power of the concave mirror in the generatrix direction, this power becomes weaker so that the entire length of the optical system extends in the generatrix direction.

Figure 7:
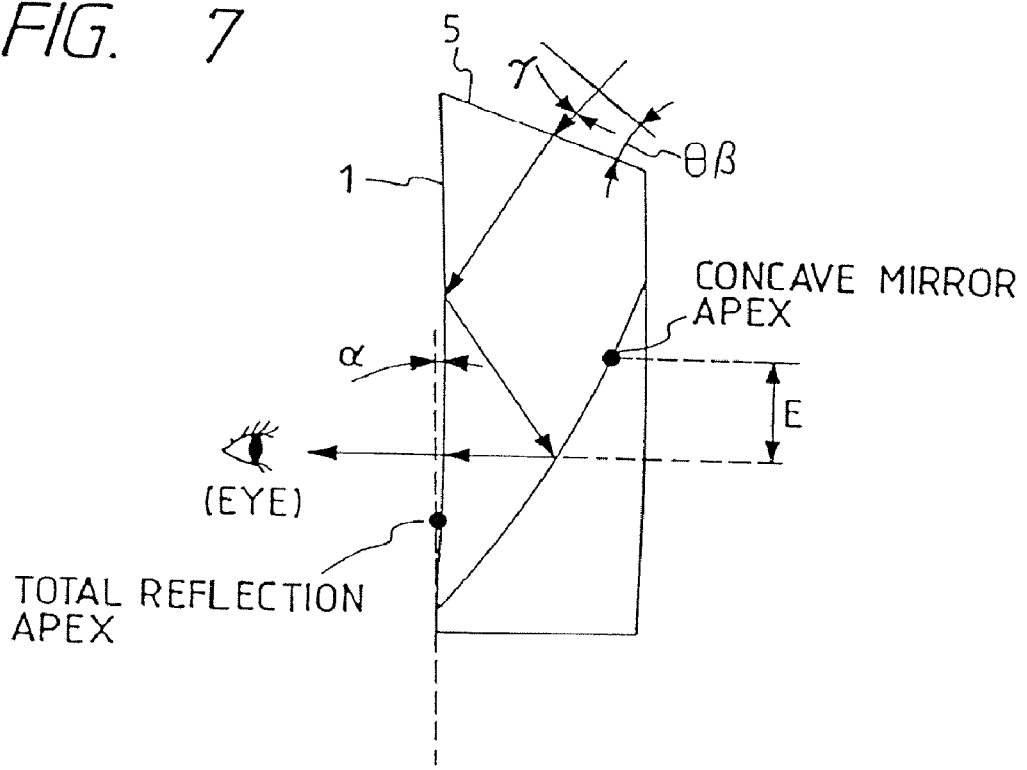

In the foregoing, the structures of the totally reflecting face (or transmitting face) 1 and the concave mirror 2 have been explained in relation principally with the curvature, but, in the present embodiment, the concave mirror 2 is subjected to a parallel shift, in the direction of generatrix (y-direction), from the optical axis of the eye toward the original image side (+) as shown in FIG. 7, whereby the eccentric distortion in the generatrix direction can also be suppressed.

The eccentric distortion can be suppressed by a parallel shift satisfying:

$$E \geqq 2.5 \text{ mm}$$

wherein E is the amount of the parallel shift or the distance from the optical axis of the eye to the vertex of the concave mirror surface in the direction of generatrix (cf. FIG. 7). In the following example 1, this amount E of parallel shift is equal to 5.2 mm, but it may be selected larger as in other examples for satisfactorily correcting the aberrations, and preferably satisfied a condition $E \geqq 23$ mm.

Then, with respect to the entrance face 5, the angle θβ between the entrance face and the original image surface constituting the display means, in the direction of generatrix, is preferably so selected as to satisfy a condition:

$$5° \leqq \theta\beta \leqq 30°$$

Below the lower limit, the entrance face and the original image surface become closer to parallel, so that the original image becomes undesirably thick in the direction parallel to the optical axis of the eye. On the other hand, above the upper limit, the original image becomes perpendicular to the direction parallel to the optical axis of the eye.

The present embodiment assumes, though not illustrated, the use of a rear light source or direct natural light for illuminating the original image. If the original image becomes perpendicular to the above-mentioned optical axis, it becomes difficult to efficiently obtain natural light for direction illumination and the false image obtained by the reflective optical system becomes darker. Consequently the present embodiment utilizes the natural light illumination and the back light illumination selectively by detecting the external illumination intensity, thereby utilizing the natural light illumination in the daytime when the natural light is strong and the back light illumination at night.

The display means 4 for forming the original image is composed of a liquid crystal display (LCD) device for compactizing the entire device, and the angle γ between the optical axis at the center of the original image and the principal ray of the light emerging from the original image (central light beam of the diaphragm constituted by the eye) (cf. FIG. 7) is preferably so selected as to satisfy:

$$|\gamma| \leqq 10°$$

This condition is required in case a liquid crystal display device is employed for providing the original image. The liquid crystal display in general has a narrow viewing angle, the light obliquely entering the display device and emerging therefrom is easily lost. Therefore, a bright false image cannot be obtained unless the light is made to enter the liquid crystal display surface and to emerge therefrom as perpendicularly as possible. The above-mentioned condition allows to observe a sufficiently bright image.

FIGS. 2A to 5B are optical cross-sectional views respectively of numerical examples 1, 2, 3, and 4 explained in the following. The configuration shown in FIGS. 2A and 2B employs toric aspherical surfaces in the concave mirror and the totally reflecting face. The configuration shown in FIGS. 3A and 3B employs anamorphic aspherical surfaces in all of the concave mirror, totally reflecting face and light entrance face. Also the configurations shown in FIGS. 4A to 5B employ anamorphic aspherical surfaces in all the optical faces.

In the numerical examples 2 to 4 corresponding to FIGS. 3A to 5B, the entrance face 5 is also provided with a curvature for attaining more satisfactory correction of aberrations.

In the present embodiment, all the optical members are composed of acrylic resin, but glass may naturally be employed instead.

In the following there are shown numerical examples of the present embodiment, wherein TAL indicates a toric aspherical lens face, and AAL indicates an anamorphic aspherical lens face.

The TAL is defined by:

$$z = \frac{y^2/r_{yi}}{1+\sqrt{1-(1+k_i)(y/r_{yi})^2}} + A_i y^4 + B_i y^6 + C_i y^8 + D_i y^{10}$$

wherein i indicates the face number.

Also the AAL is defined by:

$$z = \frac{y^2 r_{iy} + x^2/r_{ix}}{+\sqrt{1-\{(1+k_{yi})(y/r_{yi})^2+(1+k_{xi})(x/r_{xi})^2\}}} + $$
$$AR_i\{(1+AP_i)y^2+(1-AP_i)x^2\}^2 + BR_i\{(1+BP_i)y^2 + $$
$$(1-BP_i)x^2\}^3 + CR_i\{(1+CP_i)y^2+(1-CP_i)x^2\}^4 + $$
$$DR_i\{(1+DP_i)y^2+(1-DP_i)x^2\}^5$$

wherein i indicates the face number.

$A_i$ and $B_i$ are aspherical coefficients.

In the following examples, at least the totally reflecting face is constructed with a face with variable refractive power depending on the azimuthal angle, but it may also be constructed with a rotationally symmetrical spherical or aspherical face.

Example 1

| | $r_{yi}$ [mm] radius of curvature in generatrix direction | $r_{xi}$ [mm] radius of curvature in meridian direction | y, z coordinates of vertex | | tilt angle in generatrix direction | |
|---|---|---|---|---|---|---|
| i = 1 | ∞ | | (0, 0) | | 0 | |
| 2 | −548.019 | −74.077 | (−0.05, 19.80) | TAL | 0 | |
| 3 | −57.595 | −40.526 | (5.10, 29.14) | TAL | −22 | in prism |
| 4 | −548.019 | −74.077 | (−0.05, 19.80) | TAL | 0 | |
| 5 | ∞ | | (18.58, 28.07) | | 68.90 | |
| 6 | ∞ | | (21.38, 29.15) | | 51.17 | |

| | $K_2, K_4$ | $A_2, A_4$ | $B_2, B_4$ | $C_2, C_4$ | $D_2, D_4$ |
|---|---|---|---|---|---|
| (TAL2, 4) | 613.869 | −0.473E−5 | 0.326E−7 | −0.940E−10 | 0.991E−13 |
| | $K_3$ | $A_3$ | $B_3$ | $C_3$ | $D_3$ |
| (TAL3) | −1.360 | 0.345E−5 | −0.301E−7 | 0.944E−10 | −0.113E−12 |

| | | | | |
|---|---|---|---|---|
| refractive index (d-line) of prism | 1.49171 | focal length in generatrix direction | $f_y$ = 21.07 mm |
| Abbe's number (d-line) of prism | 57.4 | focal length in meridian direction | $f_x$ = 21.86 mm |

(numerical data)

| | |
|---|---|
| $\alpha$ = −1.8° | E = 5.2 mm |
| $|f_y/f_x|$ = 0.96 | $\gamma$ = 1.36 |
| $|r_x/r_y|$ = 0.7 | $\beta$ = 17.7 |
| $2f_x/r_{x2}$ = −0.59 | |
| $2f_x/r_{x3}$ = −1.08 | |
| $2f_y/r_{y2}$ = −0.08 | |
| $2f_y/r_{y3}$ = 0.73 | |

Example 2

| | $r_{yi}$[mm] radius of curvature in generatrix direction | $r_{xi}$[mm] radius of curvature in meridian direction | y, z coordinates of vertex | | tilt angle in generatrix direction | |
|---|---|---|---|---|---|---|
| i = 1 | ∞ | | (0, 0) | | 0 | |
| 2 | −2158.074 | −32.224 | (0.60, 19.83) | AAL | −10.55 | ⎫ |
| 3 | −63.157 | −32.870 | (34.76, 30.90) | AAL | 15.81 | ⎬ in prism |
| 4 | −2158.074 | −32.224 | (0.60, 19.83) | AAL | −10.55 | ⎬ |
| 5 | 72.108 | 1049.744 | (14.82, 29.00) | AAL | 53.74 | ⎭ |
| 6 | ∞ | | (17.03, 30.62) | | 42.91 | |

| | | | | | | |
|---|---|---|---|---|---|---|
| (AAL2, 4) | $K_{y2,4}$ −13763.5 | $K_{x2,4}$ −3.896 | $AR_{2,4}$ −0.170E−4 | $BR_{2,4}$ 0.401E−7 | $CR_{2,4}$ −0.154E−9 | $DR_{2,4}$ 0.223E−12 |
| | | | $AP_{2,4}$ 0.245 | $BP_{2,4}$ 0.416E−1 | $CP_{2,4}$ 0.870E−1 | $DP_{2,4}$ 0.203E−1 |
| (AAL3) | $K_{y3}$ 1.238 | $K_{x3}$ 0.279 | $AR_3$ −0.317E−5 | $BR_3$ 0.248E−8 | $CR_3$ −0.179E−11 | $DR_4$ 0.608E−15 |
| | | | $AP_3$ 0.249 | $BP_3$ 0.327E−2 | $CP_3$ −0.192E−1 | $DP_3$ 0.181E−1 |
| (AAL5) | $K_{y5}$ 6.285 | $K_{x5}$ −1.33E−6 | $AR_5$ −0.114E−4 | $BR_5$ −0.402E−6 | $CR_5$ 0.113E−8 | $DR_5$ −0.411E−10 |
| | | | $AP_5$ 0.273E1 | $BP_5$ 0.155E1 | $CP_5$ 0.160E1 | $DP_5$ −0.644 |

| refractive index (d-line) of prism | 1.49171 | focal length in generatrix direction | $f_y$ = 23.20 mm |
|---|---|---|---|
| Abbe's number (d-line) of prism | 57.4 | focal length in meridian direction | $f_x$ = 24.09 mm |

(numerical data)

$\alpha = -10.5°$  $2f_x/r_{x2} = -1.5$  $2f_y/r_{y3} = -0.73$
$|f_y/f_x| = 0.96$  $2f_x/r_{x3} = -1.47$  $E = 34.1$ mm
$r_x/r_y = 0.52$  $2f_y/r_{y2} = -0.02$  $\gamma = 0.23°$
  $\beta = 10.8°$

Example 3

| | $r_{yi}$[mm] radius of curvature in generatrix direction | $r_{xi}$[mm] radius of curvature in meridian direction | y, z coordinates of vertex | | tilt angle in generatrix direction | |
|---|---|---|---|---|---|---|
| i = 1 | | | (0, 0) | | 0 | |
| 2 | −3945.723 | −49.792 | (3.665, 20.415) | AAL | 0.04 | ⎫ |
| 3 | −67.136 | −38.803 | (36.403, 32.01) | AAL | 14.60 | ⎬ in prism |
| 4 | −3945.723 | −49.792 | (3.665, 20.415) | AAL | 0.04 | ⎬ |
| 5 | 123.302 | 843.030 | (19.610, 28.357) | AAL | 61.72 | ⎭ |
| 6 | ∞ | | (22.402, 29.859) | | 52.54 | |

| | | | | | | |
|---|---|---|---|---|---|---|
| (AAL2, 4) | $K_{y2,4}$ 7202.73 | $K_{x2,4}$ −7.709 | $AR_{2,4}$ −0.142E−7 | $BR_{2,4}$ 0.379E−7 | $CR_{2,4}$ −0.154E−9 | $DR_{2,4}$ 0.198E−12 |
| | | | $AP_{2,4}$ −0.183 | $BP_{2,4}$ 0.710E−1 | $CP_{2,4}$ 0.514E−1 | $DP_{2,4}$ 0.201E−1 |
| (AAL3) | $K_{y3}$ 1.066 | $K_{x3}$ 0.193 | $AR_3$ −0.222E−5 | $BR_3$ 0.321E−8 | $CR_3$ −0.188E−11 | $DR_3$ 0.461E−15 |
| | | | $AP_3$ 0.390 | $BP_3$ 0.586E−1 | $CP_3$ −0.185E−1 | $DP_3$ −0.222E−1 |
| (AAL5) | $K_{y6}$ −85.544 | $K_{x5}$ −916252 | $AR_5$ −0.913E−6 | $CR_5$ −0.204E−9 | $DR_5$ 0.117E−13 | −0.227E−10 |
| | | | $AP_5$ 0.989E1 | $BP_5$ 0.128E1 | $CP_5$ 0.128E2 | $DP_5$ −0.952E−1 |

-continued

| | | | |
|---|---|---|---|
| refractive index (d-line) of prism | 1.49171 | focal length in generatrix direction | $f_y = 23.71$ mm |
| Abbe's number (d-line) of prism | 57.4 | focal length in meridian direction | $f_x = 23.70$ mm |

(numerical data)

| | | |
|---|---|---|
| $\alpha = 0.05°$ | $2f_x/r_{x2} = -0.95$ | $2f_y/r_{y3} = -0.71$ |
| $\|f_y/f_x\| = 1.0$ | $2f_x/r_{x3} = -1.22$ | $E = 25.6$ mm |
| $\|r_x/r_y\| = 0.58$ | $2f_y/r_{y2} = -0.01$ | $\gamma = 1.97°$ |
| | | $\beta = 15.5°$ |

Example 4

| | $r_{yi}$[mm] radius of curvature in generatrix direction | $r_{xi}$[mm] radius of curvature in meridian direction | y, z coordinates of vertex | | tilt angle in generatrix direction | |
|---|---|---|---|---|---|---|
| i = 1 | ∞ | | (0, 0) | | 0 | |
| 2 | −3752.581 | −50.580 | (2.85, 23.13) | AAL | 0 | |
| 3 | −66.938 | −38.651 | (36.37, 34.72) | AAL | 14.15 | in prism |
| 4 | −3752.581 | −50.580 | (2.85, 23.13) | AAL | 0 | |
| 5 | 306.125 | 1095.447 | (18.59, 31.48) | AAL | 69.84 | |
| 6 | ∞ | | (21.46, 32.54) | | 51.20 | |

| (AAL2, 4) | $K_{y2}, 4$ −33820.5 | $K_{x2}, 4$ −11.350 | $AR_2, 4$ −0.144E−4 | $BR_2, 4$ 0.398E−7 | $CR_2, 4$ −0.153E−9 | $DR_2, 4$ 0.201E−12 |
|---|---|---|---|---|---|---|
| | | | $AP_2, 4$ −0.152 | $BP_2, 4$ 0.730E−1 | $CP_2, 4$ 0.494E−1 | $DP_2, 4$ 0.255E−1 |
| (AAL3) | $K_{y3}$ 1.063 | $K_{x3}$ 0.127 | $AR_3$ −0.225E−5 | $BR_3$ 0.316E−8 | $CR_3$ −0.188E−11 | $DR_3$ 0.474E−15 |
| | | | $AP_3$ 0.372 | $BP_3$ 0.568E−1 | $CP_3$ −0.168E−1 | $DP_3$ −0.208E−1 |
| (AAL5) | $K_{y5}$ 745.334 | $K_{x6}$ −651374 | $AR_6$ −0.656E−6 | $BR_5$ 0.124E−6 | $CR_5$ 0.474E−12 | $DR_5$ −0.972E−11 |
| | | | $AP_5$ 0.837E1 | $BP_5$ −0.273 | $CP_5$ 0.563E1 | $DP_5$ −0.538 |

| | | | |
|---|---|---|---|
| refractive index (d-line) of prism | 1.49171 | focal length in generatrix direction | $f_y = 23.09$ mm |
| Abbe's number (d-line) of prism | 57.4 | focal length in meridian direction | $f_x = 23.09$ mm |

(numerical data)

| | | |
|---|---|---|
| $\alpha = 0°$ | $2f_x/r_{x2} = -0.91$ | $2f_y/r_{y3} = -0.69$ |
| $\|f_y/f_x\| = 1.0$ | $2f_x/r_{x3} = -1.19$ | $E = 33.5$ mm |
| $\|r_x/r_y\| = 0.58$ | $2f_y/r_{y2} = -0.01$ | $\gamma = 1.52°$ |
| | | $\beta = 18.6°$ |

As explained in the foregoing, the present invention provides a spectacle-type display having a wide viewing angle of ±16.8° in the horizontal direction and ±11.4° in the vertical direction, and an extremely small thickness of 10 to 15 mm in the direction parallel to the optical axis of the eye. It also provides satisfactorily bright optical performance. Furthermore, by constituting the concave mirror with a half-transmitting face, it is rendered possible to superimpose a bright false image of the original image with the scenery without distortion.

The foregoing embodiment has been designed to obtain a wide viewing angle, but the thickness may be made even smaller if a somewhat narrower viewing angle is selected, since the thickness according to the present invention is variable depending on the viewing angle.

In the following embodiment, there has principally been explained the optical system relating to the display of a head-up display device. In the following there will be explained a device based on the above-explained optical system and provided further with visual line detecting function.

Figure 8A:
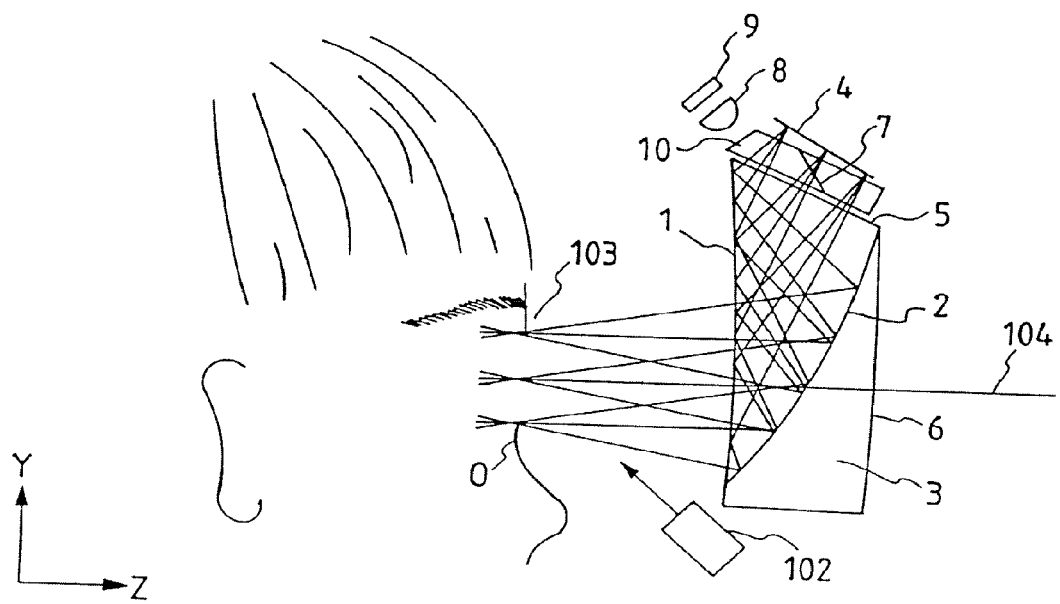
FIGS. 8A and 8B are schematic views showing the optical paths of an observation optical system of the present invention.
Figure 8B:
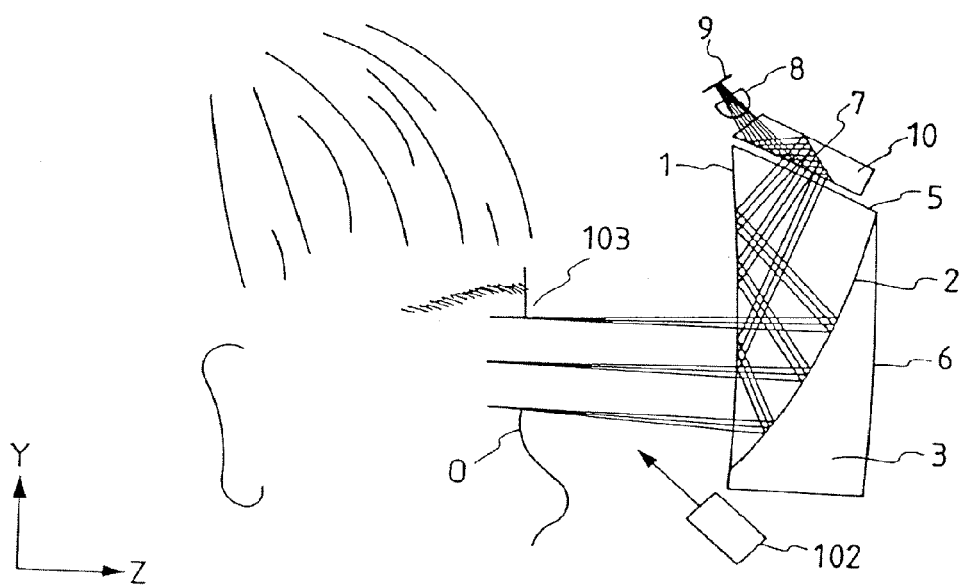
Figure 9:
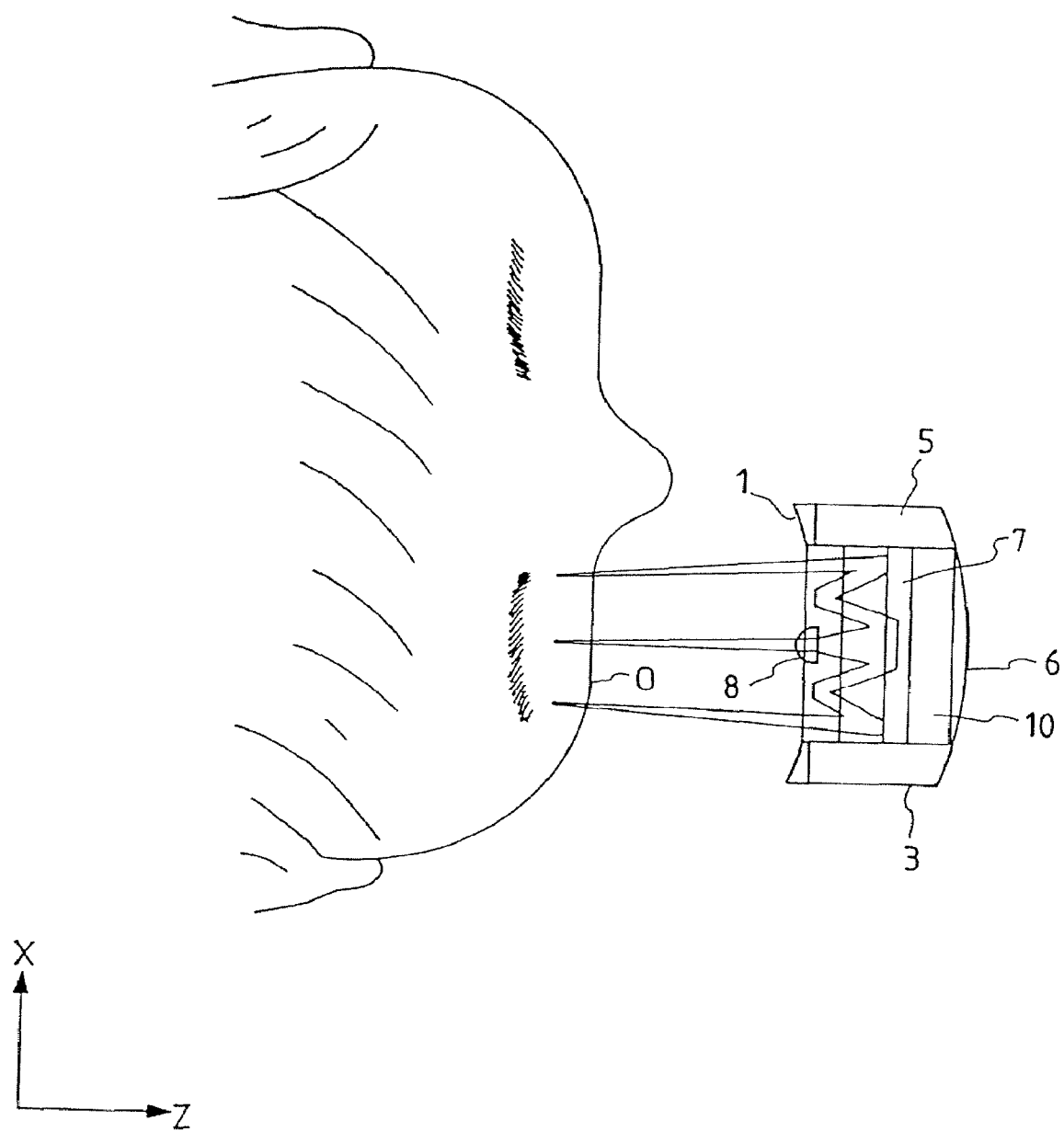
FIG. 9 is a schematic view showing the optical path of a visual axis detecting system employed in the present invention.

FIGS. 8A and 8B are partial cross-sectional views showing the optical path of an observation system and a visual line detecting system in an embodiment of the present invention, while FIG. 9 is a partial plan view of the systems shown in FIGS. 8A and 8B, and FIGS. 10 and 11 are schematic views showing the mode of use when the device of the present invention is mounted on the head of the observer.

In these drawings, there are shown an observer 101, display means 4 composed for example of a liquid crystal display device and serving to display image information in the visible wavelength region, based on signals from image information supply means such as a CD-ROM 105 or a video camera 106, and an optical member 10 consisting of a transparent parallel-faced flat plate and incorporating therein a dichroic mirror 7 serving as a beam splitter for transmitting the visible light and reflecting the infrared light. The dichroic mirror 7 may however be replaced by a simple half mirror.

A prism member 3 is provided with a front face 1 consisting of a toric aspherical surface and effecting total reflection in a part; a rear face 6 consisting of a transparent or opaque, flat or curved surface; a concave face 2 consisting of a semi-transmitting or mirror-reflecting toric aspherical surface provided in the prism member 3; and an entrance face 5. An optical axis (central axis) 104 coincides with the optical axis of the eye 103. The elements in the optical path from the display means 4 to the eye 103 constitute an observation system, for observing a false image of the image information displayed on the display means 4. Light source means 102 projects infrared light (wavelength of about 880 nm) to the eye 103 so as to form Purkinje's images, in order to detect the visual line of the eye 103 of the observer 101.

When the infrared light from the light source means 102 is projected onto the eye 103 of the observer 101 as shown in FIG. 8B, an imaging optical system (imaging lens) 8 forms a corneal reflected image, formed by the light reflected from the cornea of the eye 103, and images of pupil etc. on an image sensor 9 such as a CCD, through the prism member 3 and the dichroic mirror 7 of the optical member 10. The imaging lens 8 is provided independently from the observation system for observing the false image of the image information of the display means 4. The elements in the optical path from the light source means 102 to the image sensor 9 by way of the eye 103 constitute a visual line detecting system for detecting the visual line of the eye 103 of the observer 101. In the present embodiment, the elements of the observation system and the visual line detecting system are designed as explained in the foregoing, thereby facilitating the compactization of the entire system incorporating these two systems.

In the following there will be explained, with reference to FIGS. 8A and 8B, the observation system for observing the false image of the image information displayed on the display means 4. In the present embodiment, a visible light beam based on the image information displayed on the display means 4 is transmitted by the dichroic mirror face 7 of the optical member 10 and is introduced into the prism member 3 through the entrance face 5 thereof. It is then totally reflected by the front face 1 of the prism member 3, then reflected and condensed by the concave face 2, further transmitted by the front face 1 and guided to the eye 103 of the observer 101. In such configuration, the curvatures of the front face 1 and the concave face 2 are so suitably selected that a false image of the image information displayed on the display means 4 is formed in front of the observer 101, without a primary image plane for intermediate image formation.

As explained above, in the present embodiment, the observation system is constructed as false image type, whereby the observer 101 observes the false image of the image information. It is also possible, in the present embodiment, to constitute the concave face 2 with a semi-transmitting surface and the rear face 6 with a transmitting surface, and suitably selecting the curvature of the rear face 6, thereby spatially superimposing the external image information and the false image of the image information of the display means 4 for observation in a same viewing field with same visibility.

Figure 10:
FIGS. 10 and 11 are schematic views showing states when the display device of the present invention is worn by the observer.
Figure 11:
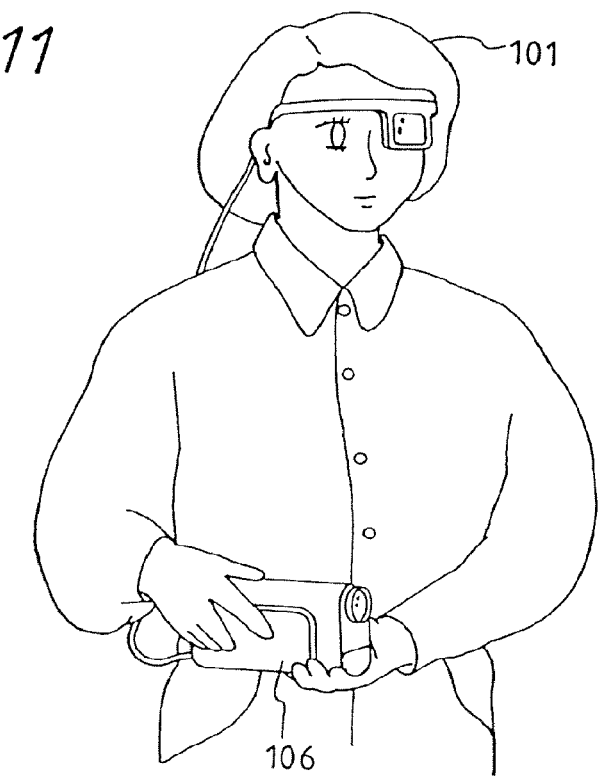

In the observation system of the present embodiment, in displaying the image information on the display means from the image information supply means such as a CD-ROM 105 or a video camera 106 held by the observer 101 as shown in FIGS. 10 and 11, the visual line information of the eye of the observer, obtained by the visual line detecting system, is utilized for various controls, such as auto focusing (focusing of the video camera), electronic zooming (electrical enlargement of the information in the direction of the visual line), zooming (calculation of the focal length f of the video camera for obtaining an image frame size extracted by the visual line and matching to said focal length), and menu selection (light metering, flash panorama size etc.) selected by the visual line.

In the following there will be explained, with reference to FIG. 9, the visual line detecting system for detecting the visual line of the eye 103 of the observer 101. The eye 103 of the observer 101 is illuminated with the infrared light from the light source means 102, and the infrared light reflected by the cornea of the eye 103 is transmitted by the front face 1 of the prism member 3, then reflected by the concave face 2, further totally reflected by the front face 1, transmitted by the entrance face 5 and guided into the optical member 10. It is then reflected by the dichroic mirror face 7 thereof, totally reflected by a face 10a thereof and is guided to the image sensor 9 through the imaging lens 8.

The imaging lens 8 forms the corneal reflected image and the images of the pupil etc. of the eye 103 on the image sensor 9, and the visual line of the eye 103 is detected from the signal of said image sensor 9.

In the present embodiment, the visual line of the eye is detected by a method disclosed for example in the Japanese Patent Laid-Open Application No. 1-274736 and Japanese Patent Application No. 3-11492 of the present applicant.

Figure 12A:
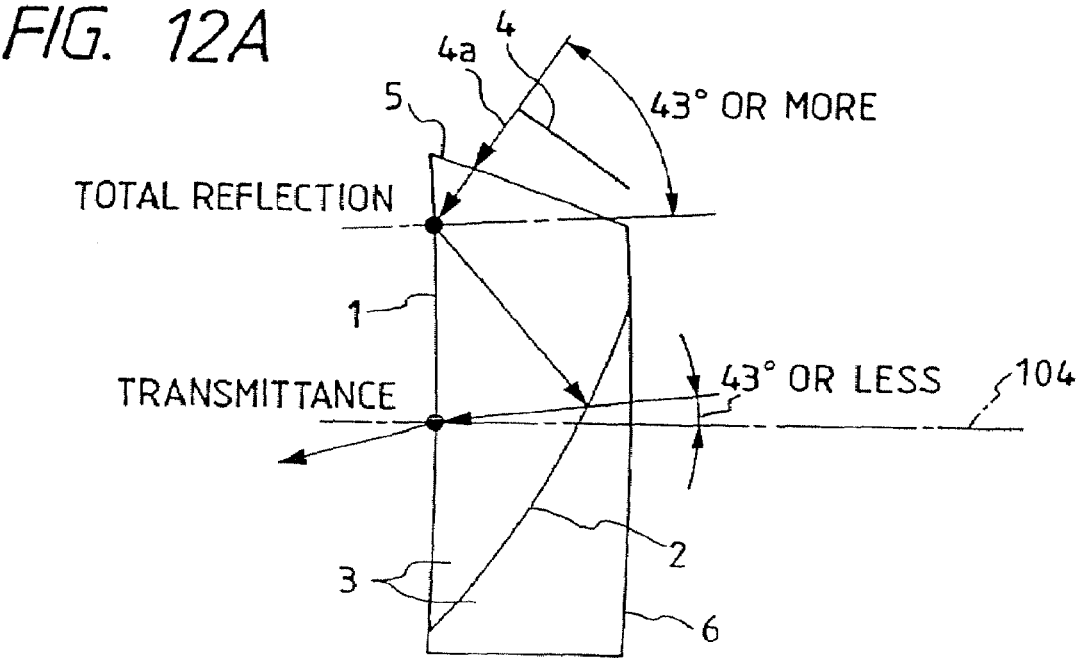
FIGS. 12A and 12B are partial magnified views of FIGS. 8A and 8B.
Figure 12B:
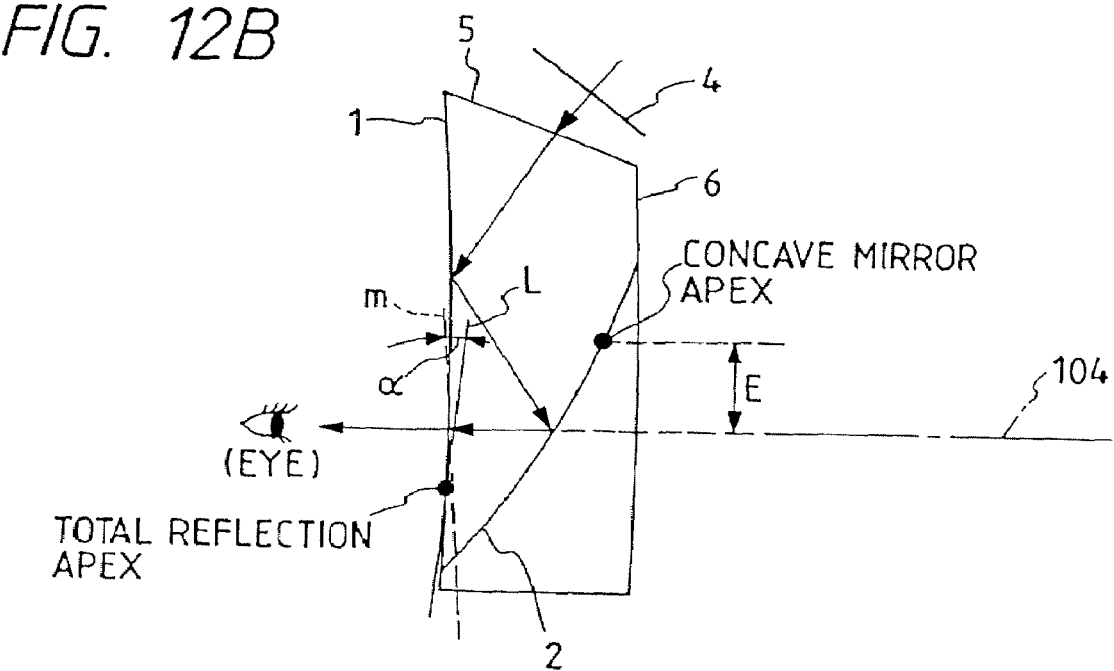

FIGS. 12A and 12B are schematic cross-sectional views of the prism member 3 employed in the present embodiment. It is employed in this case as an observation system, but, in case it is employed as the visual line detecting system, the optical functions remain the same except that the optical path is reversed. A light beam 4a, perpendicularly emitted from the display face of the display means 4 is transmitted by the entrance face 5 of the prism member 3 and enters the toric aspherical front face 1 with an incident angle at least equal to 43°, thereby being totally reflected by said front face 1. The light beam 4a is then introduced into the toric aspherical concave face 2 with an incident angle not exceeding 43°, thereby being reflected by the concave face and emitted from the front face 1.

The front face 1 is curved, and effects total reflection in a part and transmission in another part. It is therefore equivalent to two curved surfaces, and, in combination with the concave face 2, there is constituted a reflective optical system having three curved surfaces. In this manner the focal length of the entire optical system is shortened (20 to 25 mm in the following numerical examples), whereby the entire optical system can be compactized.

In the present embodiment, a toric surface, a toric aspherical surface or an anamorphic aspherical surface with variable refractive power, i.e. variable curvature, depending on the azimuthal angle is employed in the front face 1, the concave face 2 and the entrance face 5 in the observation system and the visual line detecting system 5, whereby satisfactory correction is attained for the eccentric aberration generated when the angle between the incident light and the emerging light of the concave mirror 2 is made large in order to reduce the size of the entire optical system.

The curvatures of the front face 1 and the rear face 6 are so selected as to constitute a meniscus lens having a small refractive power for the light passing through these faces, whereby the external image information such as the external scenery can be satisfactorily observed through the rear face 6.

Also in the cross section in the meridian direction, the front face 1 is given a negative refractive power, in order to correct the aberrations generated by the positive refractive power of the concave face 2. The meridian direction means a plane perpendicular to the plane containing the optical path from the center of the image on the display means to the designed center of the eye (i.e. direction perpendicular to the plane of FIGS. 12A and 12B).

Also in the present embodiment, the front face 1 may be given a negative refractive power in the cross section in the generatrix direction, for attaining an effect similar to that of the negative refractive power in the cross section in the meridian direction. The cross section in the generatrix direction means a plane containing the optical path from the center of the image of the display means to the designed center of the eye (i.e. plane of FIGS. 12A and 12B).

There is satisfied a condition:

$$|\alpha| \leq 20° \tag{1}$$

wherein $\alpha$ is the tilt angle, as shown in FIG. 12B, between a tangential line L at the vertex of the front face 1 in the cross section in the generatrix direction and a line m perpendicular to the optical axis 104 of the eye and passing the vertex of the front face 1. As indicated by the condition (1), the angle $\alpha$ is selected smaller than 20°, thereby reducing the distortion in observation of the false image of the image information of the display means 4 and the external image information such as external scenery in spatially superimposed state, and reducing the thickness of the prism in the axial direction.

In the following there will be explained other features of the observation system and the visual line detecting system including the elements (entrance face 5, front face 1 and concave face 2) provided in the optical path from the display means 4 to the eye 103.

(2-1) In the present embodiment, the imaging magnification $\beta$ of the imaging lens 8 from the eye 103 to the image sensor 9 is defined by:

$$0.02 < |\beta| < 0.18 \tag{2}$$

Above the upper limit of the condition (2), the magnification of the eye image becomes too large, so that the effective diameter of the image sensor becomes undesirably large. Also below the lower limit of the condition (2), the focal length of the visual line detecting system has to be made shorter, whereby various aberrations are generated and a satisfactory eye image cannot be obtained.

(2-2) Also there is satisfied a condition:

$$0.9 < |f_y/f_x| < 1.1 \tag{3}$$

wherein $f_y$, $f_x$ are focal lengths of the entire system respectively in the generatrix cross section and the meridian cross section, thereby maintaining a substantially constant focal length for the entire system in any azimuthal angle and dispensing with the correction for the aspect ratio, in the generatrix direction and the meridian direction, of the image information displayed on the display means.

(2-3) Also there is satisfied a condition:

$$|R_x| < |R_y| \tag{4}$$

wherein $R_y$, $R_x$ are radii of paraxial curvature of the concave face 2 respectively in the generatrix cross section and the meridian cross section. For compactizing the observation system, the optical axis of the concave face has to be significantly tilted clockwise, in the generatrix cross section, from the optical axis of the eye, but such configuration generates a large eccentric aberration. On the other hand, in the meridian cross section, such eccentric aberration is not generated much because there is little room for such eccentricity. In the present embodiment, therefore, the radius $R_y$ of curvature in the generatrix cross section is selected larger than that $R_x$ in the meridian cross section as indicated by the condition (4), or the refractive power in the generatrix direction is selected weaker than that in the meridian direction, thereby suppressing the eccentric aberration in the generatrix cross section.

In the present embodiment, for the purpose of correction of the eccentric aberration, the condition (4) is preferably set as follows:

$$|R_x/R_y| < 0.85 \tag{5}$$

(2-4) When the entrance face 5 of the prism member 3 is constituted by a toric surface or an anamorphic surface, there is selected a condition:

$$|R_{y5}| < |R_{x5}| \tag{6}$$

wherein $R_{y5}$ and $R_{x5}$ are radii of curvature respectively in the generatrix cross section and the meridian cross section. The entrance face 5 generates relatively little eccentric aberration in the generatrix cross section. Thus, though the concave face 2 and the front face 1 cannot be given strong refractive forces in the generatrix cross section, the entrance face 5 is given a strong refractive force in the generatrix cross section, thereby realizing a substantially constant focal length in any azimuthal angle in the entire system.

(2-5) Satisfactory optical performance is realized in the meridian cross section by giving a negative refractive power to the totally reflecting area of the front face 1, a positive refractive power to the concave face 2 and a negative refractive power to the transmitting area of the front face 1. In case the entrance face 5 has a refractive power, it is preferably selected as positive in the generatrix cross section, in order to cover the deficiency in the positive refractive power in the generatrix cross section in the entire system.

(2-6) Satisfactory optical performance is realized in the generatrix cross section by giving a negative refractive power in the totally reflecting area of the front face 1, and a positive refractive power to the concave face 2. In case the entrance face 5 has a refractive power, it is selected as positive in the meridian cross section, thereby reducing the aberrations in the meridian cross section.

(2-7) In the meridian cross section, there are satisfied condition:

$$0.1 < |2f_x/R_{x1}| < 2.0 \tag{7}$$

$$0.5 < |2f_x/R_{x2}| < 2.5 \tag{8}$$

wherein $R_{x1}$, $R_{x2}$ are radii of curvature respectively of the totally reflecting area of the front face 1 and of the concave face 2, and $f_x$ is the focal length of the entire system. The upper limits of the conditions (7), (8) correspond to stronger refractive forces of said curvatures, while the lower limits correspond to the weaker refractive forces. Above the upper limit of the condition (7), the distortion aberration becomes difficult to correct, and, below the lower limit, the totally reflecting condition becomes difficult to satisfy. Also above the upper limit of the condition (8), the astigmatism becomes difficult to correct, and, below the lower limit, the entire optical system becomes larger, particularly with a larger thickness in the direction parallel to the optical axis.

(2-8) In the generatrix cross section, there are satisfied condition:

$$0 < |2f_y/R_{y1}| < 1.0 \tag{9}$$

$$0.2 < |2f_y/R_{y2}| < 2.5 \tag{10}$$

wherein $R_{y1}$, $R_{y2}$ are radii curvature respectively of the totally reflecting area of the front face 1 and the concave face 2, and $f_y$ is the focal length of the entire system. The upper limits of the conditions (9) and (10) correspond to stronger refractive powers of said curvatures, while the lower limits correspond to weaker refractive powers. Above the upper limit of the condition (9), the eccentric distortion aberration becomes difficult to correct, while, below the lower limit, it becomes difficult to satisfy the totally reflecting condition. Also above the upper limit of the condition (10), eccentric astigmatism is generated significantly, and, below the lower limit, the length of the entire lens increases and the entire optical system becomes undesirably bulky.

(2-9) The concave face 2 is shifted in parallel manner, in the generatrix cross section (Y-direction), from the optical axis 104 of the eye toward the display means 4, thereby suppressing the eccentric distortion aberration in the generatrix cross section. The amount E of parallel shift (distance from the optical axis 104 to the vertex of the concave face 2 as shown in FIG. 12B) is so selected as to satisfy:

$$25 \leq E \tag{11}$$

thereby satisfactorily correcting the eccentric distortion.

(2-10) The tilt angle α in the condition (1) is so maintained as to satisfy:

$$-15° \leq \alpha \leq 5° \tag{12}$$

for effectively compactizing the entire optical system. Below the lower limit of the condition (12), the image information becomes distorted significantly, while, above the upper limit, the prism member 3 becomes thicker in the direction of the optical axis 104.

FIGS. 13 to 16 are schematic views showing modifications in a part of the visual line detecting system in the vicinity of the prism member 3.

Figure 13:
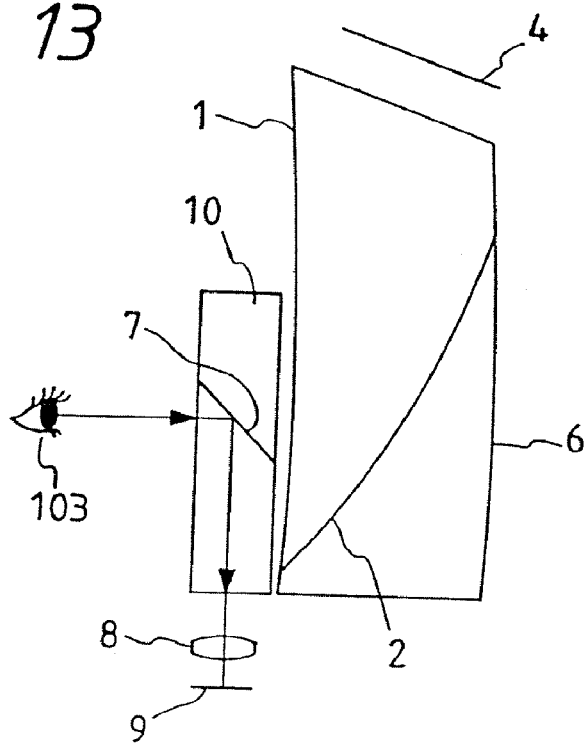
FIG. 13 is a partial schematic view in the vicinity of a prism member in an embodiment 6 of the present invention.

An embodiment shown in FIG. 13 is different from the foregoing embodiments in that the optical member 10 is provided between the eye 103 of the observer and the prism member 3, with corresponding positioning of the imaging lens 8 and the image sensor 9. This embodiment provides an advantage of exact detection of the visual line, since no eccentric face is involved in the visual line detecting system.

Figure 14:
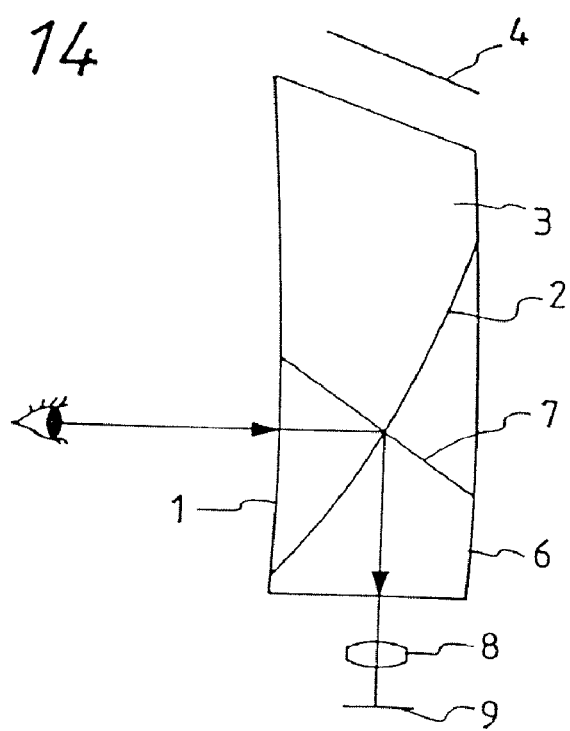
FIG. 14 is a partial schematic view in the vicinity of a prism member in an embodiment 7 of the present invention.

In an embodiment shown in FIG. 14, the dichroic face 7 is provided in inclined manner inside the prism member 3, with corresponding positioning of the imaging lens 8 and the image sensor 9. This embodiment is featured by a reduced number of components, leading to further compactization of the entire optical system.

Figure 15:
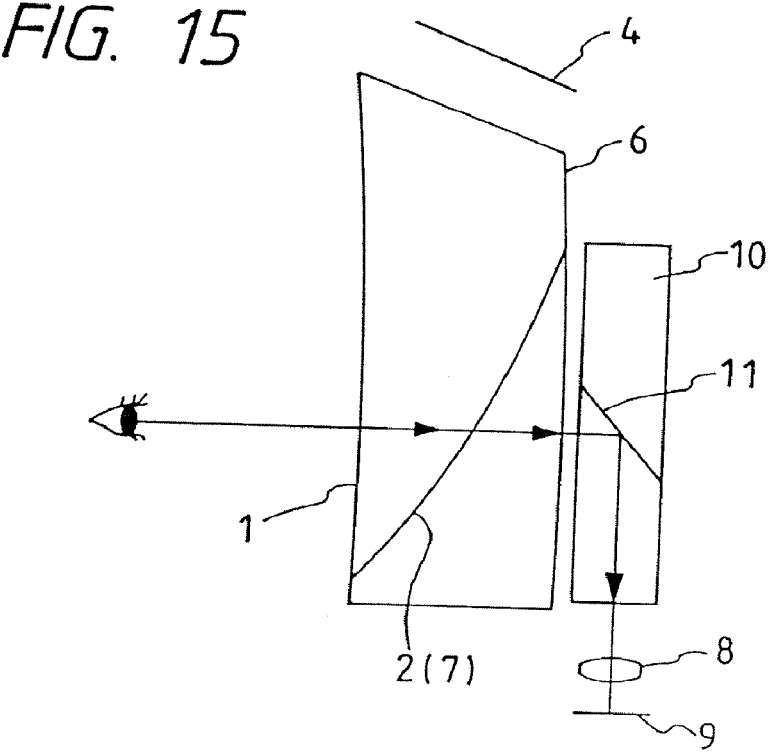
FIG. 15 is a partial schematic view in the vicinity of a prism member in an embodiment 8 of the present invention.
Figure 17A:
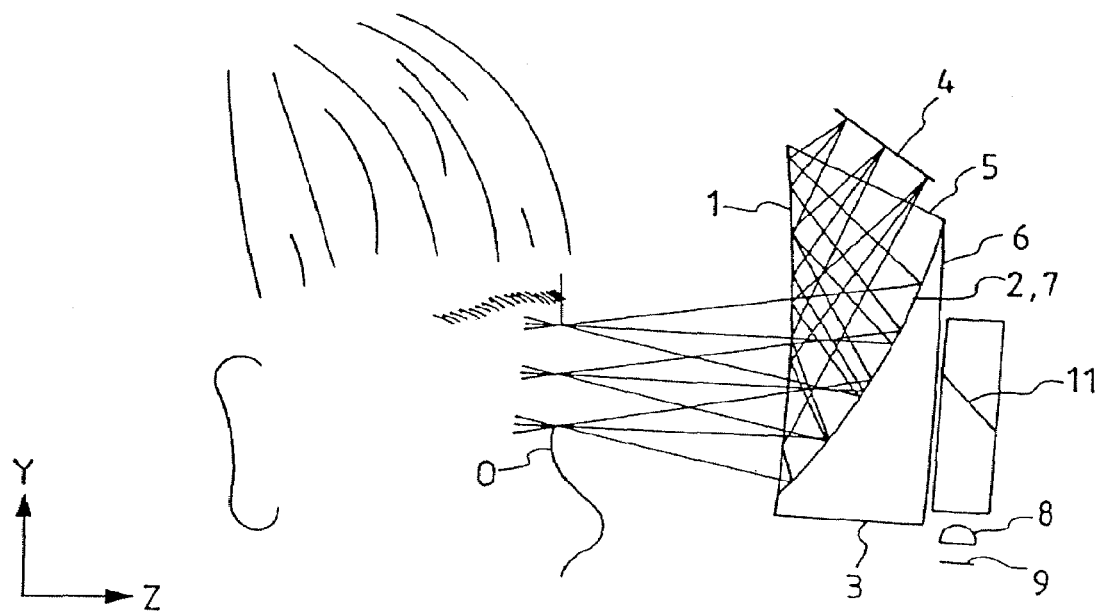
FIGS. 17A and 17B are schematic views showing the optical paths of an observation system and a visual axis detecting system in an embodiment 8 of the present invention.
Figure 17B:
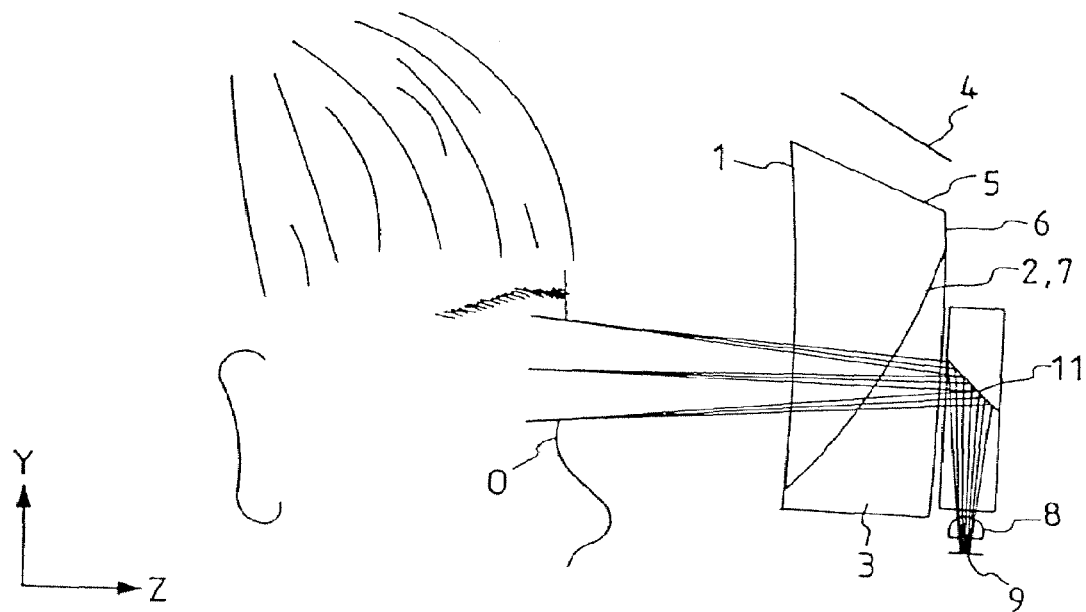

In an embodiment shown in FIG. 15, the optical member 10 is positioned farther than the prism member 3 from the eye 103. Also the concave face 2 is provided with a dichroic film reflecting the visible light and transmitting the infrared light. The optical member 10 is provided with an inclined reflecting face 11, having a semi-transmitting, totally reflecting or dichroic film, and the imaging lens 8 and the image sensor 9 are positioned accordingly. The state of mounting of the device of the present embodiment, on the head of the observer, is schematically illustrated in FIGS. 17A and 17B.

Figure 16:
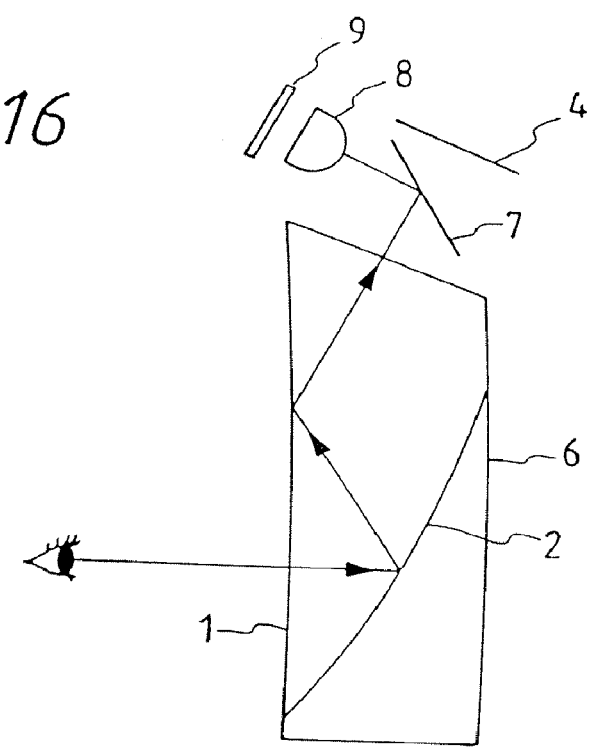
FIG. 16 is a partial schematic view in the vicinity of a prism member in an embodiment 9 of the present invention.
Figure 18A:
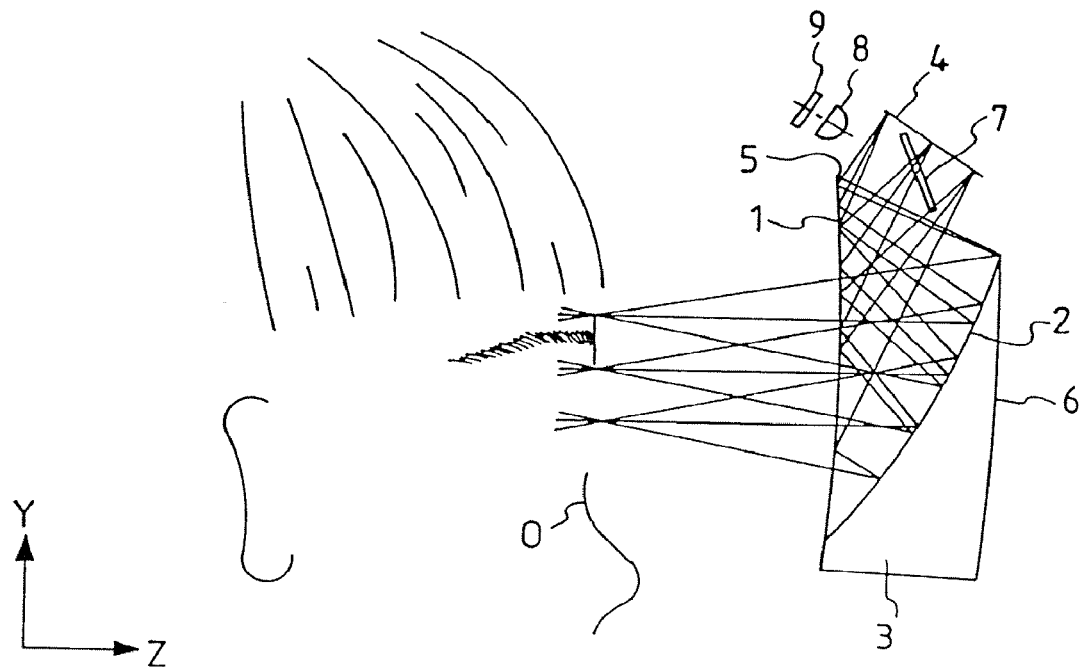
FIGS. 18A and 18B are schematic views showing the optical paths of an observation system and a visual axis detecting system in an embodiment 9 of the present invention.
Figure 18B:
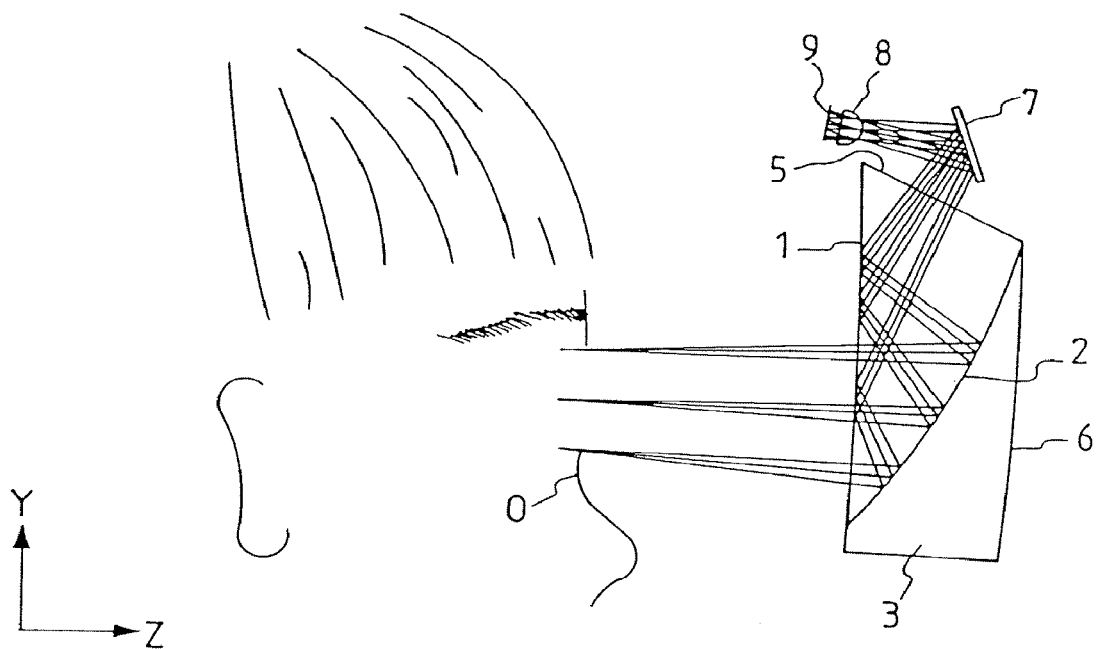

In an embodiment shown in FIG. 16, the optical member 10 consisting of a parallel-faced flat plate is replaced by a dichroic mirror 7, transmitting the visible light and reflecting the infrared light, provided on the entrance face 5 of the prism member 3, and the imaging lens 8 and the image sensor 9 are positioned accordingly. The state of mounting of the device of the present embodiment, on the head of the observer, is schematically illustrated in FIGS. 18A and 18B.

Display devices utilizing the visual line detecting systems of the above-explained embodiments can be directly applied to so-called head-up display device.

In the following there are shown numerical examples of the present embodiment, wherein elements of the system are represented as follows, with reference to FIGS. 8A, 8B and 9:

(1) eye 103 being selected as the original point (0, 0) of the coordinate system;

(2) in the visual line detecting system, in tracing the light from the eye 103;
 i=1 eye
 i=2 front face 1 (transmitting face)
 i=3 concave face 2
 i=4 front face (totally reflecting face)
 i=5 entrance face 5
 i=6 entrance face of optical member 10
 i=7 dichroic face
 i=8
 i=9 exit face of optical member 10
 i=10 entrance face of imaging lens
 i=11 exit face of imaging lens
 i=12 image sensor
 in the observation system;
 i=8 entrance face of image information
 i=9 display face of image information (3) TAL indicates a toric aspherical surface; and AAL indicates an anamorphic aspherical surface.

The TAL is defined, in the generatrix (Y-Z) cross section, by the following aspherical equation:

$$Z = \frac{y^2/ryi}{1+\sqrt{1-(1+ki)(y/ryi)^2}} + Aiy^4 + Biy^6 + Ciy^8 + Diy^{10}$$

wherein i indicates the face number, and is spherical in the meridian (X-Z) cross section.

Also the AAL is defined by:

$$Z = \frac{y^2/riy + x^2/rix}{1+\sqrt{1-\{(1+kyi)(y/ryi)^2 + (1+kxi)(x/rxi)^2\}}} +$$
$$ARi\{(1+APi)y^2 + (1-APi)x^2\}^2 + BRi\{(1+BPi)y^2 +$$
$$(1-BPi)x^2\}^3 + CRi\{(1+CPi)y^2 + (1-CPi)x^2\}^4 +$$
$$DRi\{(1+DPi)y^2 + (1-DPi)x^2\}^5$$

wherein i indicates the face number.

Also in the present invention, AL indicates a rotationally symmetrical aspherical surface, which is defined by:

$$Z = \frac{y^2/ryi}{1+\sqrt{1-(1+ki)(y/ryi)^2}} + Aiy^4 + Biy^6 + Ciy^8 + Diy^{10}$$

wherein i indicates the face number. The surface vertex coordinate (Y, Z) is an absolute coordinate when the vertex of the eye surface is taken as (0, 0). The tilt angle in the generatrix cross section indicates the tilt angle of the optical axis of each face, with respect to the optical axis of the eye, said angle being taken positive anticlockwise. A reflecting face (including totally reflecting face) is indicated by a suffix M. nd and vd respectively indicate the refractive index and the Abbe's number for d-line.

Numerical Example 5

| | | (Visual line detecting system) | | | | |
|---|---|---|---|---|---|---|
| | $r_{yi}$ Radius of curvature in generatrix cross section | $r_{xi}$ Radius of curvature in meridian cross section | Vertex coordinate Y, Z | Tilt angle in generatrix cross section | | |
| i = 1 | ∞ | | (0, 0) | 0° | eye | |
| i = 2 | −514.575 | −52.805 | (0, 21.15) | 0 | TAL | |
| i = 3 | −63.546 | −42.575 | (26.30, 35.96) | −3.33 | TAL-M | nd = 1.49171 |
| i = 4 | −514.575 | −52.805 | (0, 21.15) | 0 | TAL-M | vd = 57.4 |
| i = 5 | ∞ | | (20.72, 28.06) | 65.37 | | |
| i = 6 | ∞ | | (21.18, 28.27) | 65.37 | | |
| i = 7 | ∞ | | (23.41, 28.20) | 30.37 | M | nd = 1.51633 |
| i = 8 | ∞ | | (21.18, 28.27) | 65.37 | M | vd = 64.1 |
| i = 9 | ∞ | | (24.93, 20.09) | −54.64 | | |
| i = 10 | −1.889 | | (26.90, 21.14) | −54.64 | AL | nd = 1.49171 |
| i = 11 | 1.426 | | (29.35, 19.41) | −54.64 | AL | vd = 57.4 |
| i = 12 | ∞ | | (30.51, 18.95) | −51.60 | image sensor | |
| | | (Observation system) | | | | |
| i = 8 | ∞ | | (23.91, 29.52) | 65.37 | | nd = 1.51633 |
| | | | | | | vd = 64.1 |
| i = 9 | ∞ | | (24.98, 30.01) | 59.37 | image information | |
| | | (TAL, AL data) | | | | |
| TAL2, 4: | K = 460.670, | A = −0.227E−5, | B = 0.179E−7, | C = −0.453E−10, | D = 0.429E−13 | |
| TAL3: | K = 1.105, | A = −0.709E−6, | B = −0.273E−8, | C = −0.191E−11, | D = 0.631E−15 | |
| AL10: | K = −3.858, | A = 0.851E−2, | B = −0.101, | C = 0.149, | D = −0.755E−1 | |
| AL11: | K = −0.113, | A = 0.195, | B = −0.590, | C = 0.471, | D = −0.138 | |

(1) α = 0
(2) |β| = 0.10
(3) |fy/fx| = 1.00
(5) |Rx1/Ry1| = 0.10
    |Rx2/Ry2| = 0.67
(7) 2fx/Rx1 = −0.88
(8) 2fx/Rx2 = −1.09
(9) 2fy/Ry1 = −0.04
(10) 2fy/Ry2 = −0.36
(11) E = 26.3

Numerical Example 6

| | | (Visual line detecting system) | | | | |
|---|---|---|---|---|---|---|
| | $r_{yi}$ Radius of curvature in generatrix cross section | $r_{xi}$ Radius of curvature in meridian cross section | Vertex coordinate Y, Z | Tilt angle in generatrix cross section | | |
| i = 1 | ∞ | | (0, 0) | 0° | eye | |
| i = 2 | −514.575 | −52.805 | (0, 21.15) | 0 | TAL | nd = 1.49171 |
| i = 3 | −63.546 | −42.575 | (26.30, 35.96) | −3.33 | TAL | vd = 57.4 |
| i = 4 | −514.575 | −52.805 | (0, 34.15) | 0 | TAL | |
| i = 5 | ∞ | | (0, 37.15) | 45 | M | |
| i = 6 | −1.889 | | (−13.0, 37.15) | 90 | AL | nd = 1.49171 |
| i = 7 | 1.426 | | (−16.0, 37.15) | 90 | AL | vd = 57.4 |
| i = 8 | ∞ | | (−17.27, 37.15) | 90 | image sensor | |
| | | (Observation system) | | | | |
| i = 3 | −63.546 | −42.575 | (26.30, 35.96) | −3.33 | TAL-M | nd = 1.51633 |
| i = 4 | −514.575 | −52.805 | (0, 21.15) | 0 | TAL-M | vd = 64.1 |

-continued

| | | (Visual line detecting system) | | | |
|---|---|---|---|---|---|
| i = 5 | ∞ | (20.72, 28.06) | 65.37 | | |
| i = 6 | ∞ | (24.05, 29.59) | 54.25 | image information | |

| | | (TAL, AL data) | | | |
|---|---|---|---|---|---|
| TAL2, 4: | K = 460.670, | A = −0.227E−5, | B = 0.179E−7, | C = −0.453E−10, | D = 0.429E−13 |
| TAL3: | K = 1.105, | A = −0.709E−6, | B = 0.273E−8, | C = −0.191E−11, | D = 0.631E−15 |
| AL6: | K = −3.858, | A = 0.851E−2, | B = −0.101, | C = 0.149, | D = −0.755E−1 |
| AL7: | K = −0.113, | A = 0.195, | B = −0.590, | C = 0.471, | D = −0.138 |

(1) α = 0
(2) |β| = 0.05
(3) |fy/fx| = 1.00
(5) |Rx1/Ry1| = 0.10
    |Rx2/Ry2| = 0.67
(7) 2fx/Rx1 = −0.88
(8) 2fx/Rx2 = −1.09
(9) 2fy/Ry1 = −0.04
(10) 2fy/Ry2 = −0.36
(11) E = 26.3

Numerical Example 7

| | $r_{yi}$ Radius of curvature in generatrix cross section | $r_{xi}$ Radius of curvature in meridian cross section | Vertex coordinate Y, Z | Tilt angle in generatrix cross section | | |
|---|---|---|---|---|---|---|
| (Visual line detecting system) | | | | | | |
| i = 1 | ∞ | | (0,0) | 0° | eye | |
| i = 2 | −2158.074 | −32.224 | (0.60, 19.85) | −10.55 | AAL | |
| i = 3 | −63.157 | −32.870 | (34.76, 30.92) | 15.81 | AAL-M | nd = 1.49171 |
| i = 4 | −2158.074 | −32.224 | (0.60, 19.83) | −10.55 | AAL-M | νd = 57.4 |
| i = 5 | 72.108 | 1049.744 | (14.82, 29.02) | 53.74 | AAL | |
| i = 6 | ∞ | | (14.98, 29.14) | 53.74 | | |
| i = 7 | ∞ | | (17.19, 29.51) | 18.74 | M | nd = 1.51633 |
| i = 8 | ∞ | | (14.98, 29.14) | 53.74 | M | νd = 64.1 |
| i = 9 | ∞ | | (20.31, 21.88) | −66.27 | | |
| i = 10 | −1.889 | | (22.03, 23.31) | −66.27 | AL | nd = 1.49171 |
| i = 11 | 1.426 | | (24.77, 22.10) | −66.27 | AL | νd = 57.4 |
| i = 12 | ∞ | | (25.96, 21.91) | −63.23 | image sensor | |
| (Observation system) | | | | | | |
| i = 8 | ∞ | | (17.40, 30.91) | 53.74 | | nd = 1.51633 |
| | | | | | | νd = 64.1 |
| i = 9 | ∞ | | (18.21, 31.50) | 44.74 | image information | |

| | | (AAL, AL data) | | | |
|---|---|---|---|---|---|
| | | AAL2, 4: | | | |
| Ky = −13763.5, | AR = −0.170E−4, | BR = 0.401E−7, | CR = −0.154E−9, | DR = 0.223E−12 | |
| Kx = −3.896, | AP = −0.245, | BP = 0.416E−1, | CP = 0.870E−1, | DP = −0.203E−1 | |
| | | AAL3: | | | |
| Ky = 1.238, | AR = −0.317E−5, | BR = 0.248E−8, | CR = −0.179E−11, | DR = 0.608E−15 | |
| Kx = 0.279, | AP = +0.249, | BP = 0.327E−2, | CP = −0.192E−1, | DP = 0.181E−1 | |
| | | AAL5: | | | |
| Ky = 6.285, | AR = −0.114E−4, | BR = −0.402E−6, | CR = 0.113E−8, | DR = −0.411E−1 | |
| Kx = −1.33E−6, | AP = 0.273E+1, | BP = 0.155E+1, | CP = 0.160E+1, | DP = −0.644 | |
| AL10: | K = −3.858, | A = 0.851E−2, | B = −0.101, | C = 0.149, | D = −0.755E−1 |
| AL11: | K = −0.113, | A = 0.195, | B = −0.590, | C = 0.471, | D = −0.138 |

(1) α = −10.5
(2) |β| = 0.12

-continued (Visual line detecting system)

(3) $|fy/fx| = 0.96$
(5) $|Rx1/Ry1| = 0.01$
    $|Rx2/Ry2| = 0.52$
(7) $2fx/Rx1 = -1.5$
(8) $2fx/Rx2 = -1.47$
(9) $2fy/Ry1 = -0.02$
(10) $2fy/Ry2 = -0.73$
(11) $E = 34.8$

Numerical Example 8

(Visual line detecting system)

| | $r_{yi}$ Radius of curvature in generatrix cross section | $r_{xi}$ Radius of curvature in meridian cross section | Vertex coordinate Y, Z | Tilt angle in generatrix cross section | | |
|---|---|---|---|---|---|---|
| i = 1 | ∞ | | (0, 0) | 0° | eye | |
| i = 2 | −9423.260 | −47.769 | (0, 20.38) | 1.50 | AAL | |
| i = 3 | −65.701 | −36.469 | (33.13, 29.99) | 14.29 | AAL-M | nd = 1.49171 |
| i = 4 | −9433.260 | −47.769 | (0, 20.38) | 1.50 | AAL-M | vd = 57.4 |
| i = 5 | 7188.930 | −49.971 | (16.33, 26.54) | 62.55 | AAL | |
| i = 6 | ∞ | | (19.89, 27.27) | 21.55 | M | |
| i = 7 | −1.889 | | (21.28, 20.34) | −11.45 | AL | nd = 1.49171 |
| i = 8 | 1.426 | | (21.88, 17.39) | −11.45 | AL | vd = 57.4 |
| i = 9 | ∞ | | | −8.45 | image sensor | |

(Observation system)

| i = 7 | ∞ | | (21.11, 29.03) | 55.43 | image information |

(AAL, AL data)

AAL2, 4:

Ky = −361850, AR = −0.183E−4, BR = 0.381E−7, CR = −0.114E−9, DR = 0.153E−12
Kx = −13.802, AP = −0.317, BP = −0.602E−1, CP = 0.272E−1, DP = −0.211E−1

AAL3:

Ky = 1.227, AR = −0.209E−5, BR = 0.308E−8, CR = −0.190E−11, DR = 0.505E−15
Kx = 0.172, AP = 0.472, BP = 0.553E−1, CP = −0.265E−1, DP = 0.751E−2

AAL5:

Ky = 987000, AR = −0.871E−5, BR = −0.264E−6, CR = 0.469E−13, DR = 0.137E−11
Kx = −70.169, AP = 41.763, BP = −0.395, CP = 0.183E+2, DP = −0.988

AL7: K = −3.858, A = 0.851E−2, B = −0.101, C = 0.149, D = −0.755E−1
AL8: K = −0.113, A = 0.195, B = −0.590, C = 0.471, D = −0.138

(1) $\alpha = 1.5$
(2) $|\beta| = 0.10$
(3) $|fy/fx| = 1.00$
(5) $|Rx1/Ry1| = 0.005$
    $|Rx2/Ry2| = 0.56$
(7) $2fx/Rx1 = -0.93$
(8) $2fx/Rx2 = -1.22$
(9) $2fy/Ry1 = -0.46$
(10) $2fy/Ry2 = -0.61$
(11) $E = 33.1$ Numerical Example 9

(Visual line detecting system)

| | $r_{yi}$ Radius of curvature in generatrix cross section | $r_{xi}$ Radius of curvature in meridian cross section | Vertex coordinate Y, Z | Tilt angle in generatrix cross section | | |
|---|---|---|---|---|---|---|
| i = 1 | ∞ | | (0, 0) | 0° | eye | |
| i = 2 | −9538.246 | −47.590 | (0, 21.30) | 7.28 | AAL | |
| i = 3 | −65.6 | −36.035 | (32.96, 31.40) | 14.67 | AAL-M | nd = 1.49171 |
| i = 4 | −9538.246 | −47.590 | (0, 21.30) | 0.28 | AAL-M | vd = 57.4 |
| i = 5 | 225.188 | 727.642 | (16.47, 28.45) | 65.28 | AAL | |
| i = 6 | ∞ | | (16.92, 28.60) | 67.28 | | |
| i = 7 | ∞ | | (19.15, 28.51) | 35.28 | M | |
| i = 8 | ∞ | | (16.92, 28.66) | 67.28 | M | nd = 1.51633 |
| i = 9 | ∞ | | (19.69, 29.82) | 67.28 | M | vd = 64.1 |
| i = 10 | ∞ | | (23.55, 20.60) | −167.72 | | |
| i = 11 | 1.889 | | (21.38, 20.05) | −167.72 | AL | nd = 1.49171 |
| i = 12 | −1.426 | | (20.74, 17.12) | −167.72 | AL | vd = 57.4 |
| i = 13 | ∞ | | (20.19, 16.01) | −164.69 | image sensor | |

(Observation system)

| | | | | | | |
|---|---|---|---|---|---|---|
| i = 8 | ∞ | | (19.69, 29.82) | 67.28 | | nd = 1.51633 |
| | | | | | | vd = 64.1 |
| i = 9 | ∞ | | (22.02, 29.17) | 54.10 | image information | |

(AAL, AL data)

AAL2, 4:

Ky = −387540, AR = −0.183E−4, BR = 0.378E−7, CR = −0.117E−9, DR = 0.158E−12
Kx = −20.897, AP = −0.300, BP = −0.548E−1, CP = 0.326E−1, DP = −0.228E−1

AAL3:

Ky = 1.213, AR = −0.224E−5, BR = 0.305E−8, CR = −0.190E−11, DR = 0.500E−15
Kx = 0.165, AP = −0.464, BP = 0.630E−1, CP = −0.251E−1, DP = 0.380E−2

AAL5:

Ky = 559.028, AR = −0.675E−5, BR = 0.182E−6, CR = 0.212E−12, DR = −0.189E−10
Kx = −99429.4, AP = 0.486E+1, BP = −0.125E+1, CP = 0.111E+2, DP = −0.789

| AL11: | K = −3.858, | A = 0.851E−2, | B = −0.101, | C = 0.149, | D = −0.755E−1 |
| AL12: | K = −0.113, | A = 0.195, | B = −0.590, | C = 0.471, | D = −0.138 |

(1) α = 0.28
(2) |β| = 0.11
(3) |fy/fx| = 1.00
(5) |Rx1/Ry1| = 0.005
    |Rx2/Ry2| = 0.55
(7) 2fx/Rx1 = −0.95
(8) 2fx/Rx2 = −1.26
(9) 2fy/Ry1 = −0.005
(10) 2fy/Ry2 = −0.69
(11) E = 33.0

According to the present invention, as explained in the foregoing, there is provided a display device, such as a head-mount display, enabling compactization and provided with a visual line detecting system capable of controlling, based on the visual line information, the observation state of the image information displayed by the display means in the observation system, by suitably designing said observation system for observing the image information displayed by the display means and the visual line detecting system provided, in a part of the observation system, for detecting the visual line of the observer.

In the following there will be explained the control of the display device utilizing the above-explained visual line detecting function.

Figure 19A:
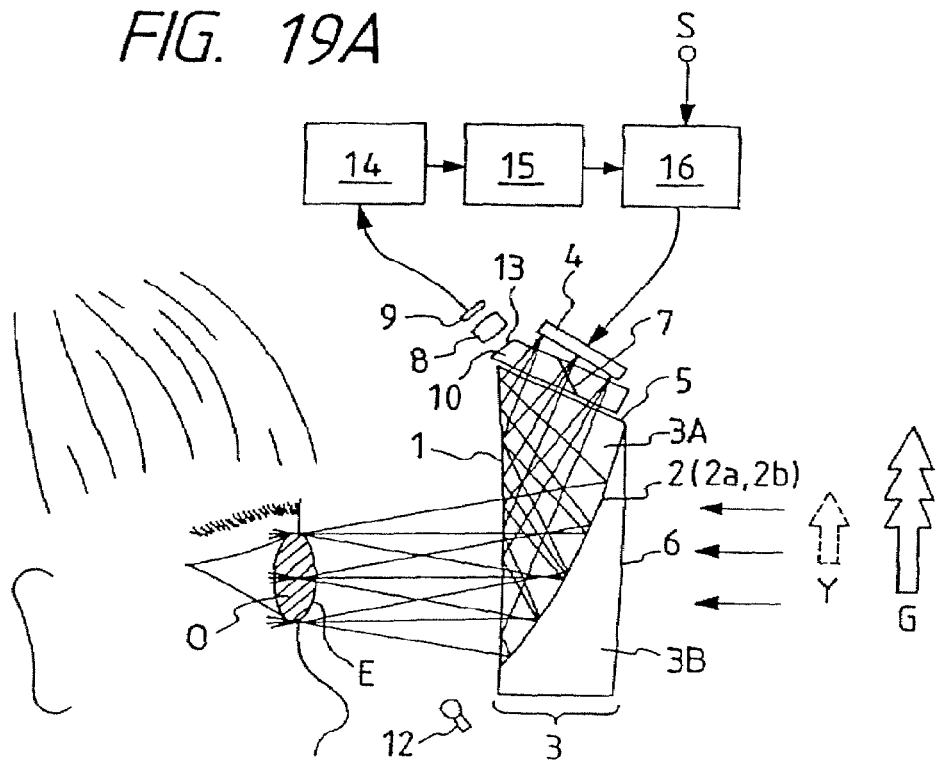
FIGS. 19A and 19B are partial schematic views of an observation optical system and a visual axis detecting optical system, respectively, of the present invention.
Figure 19B:
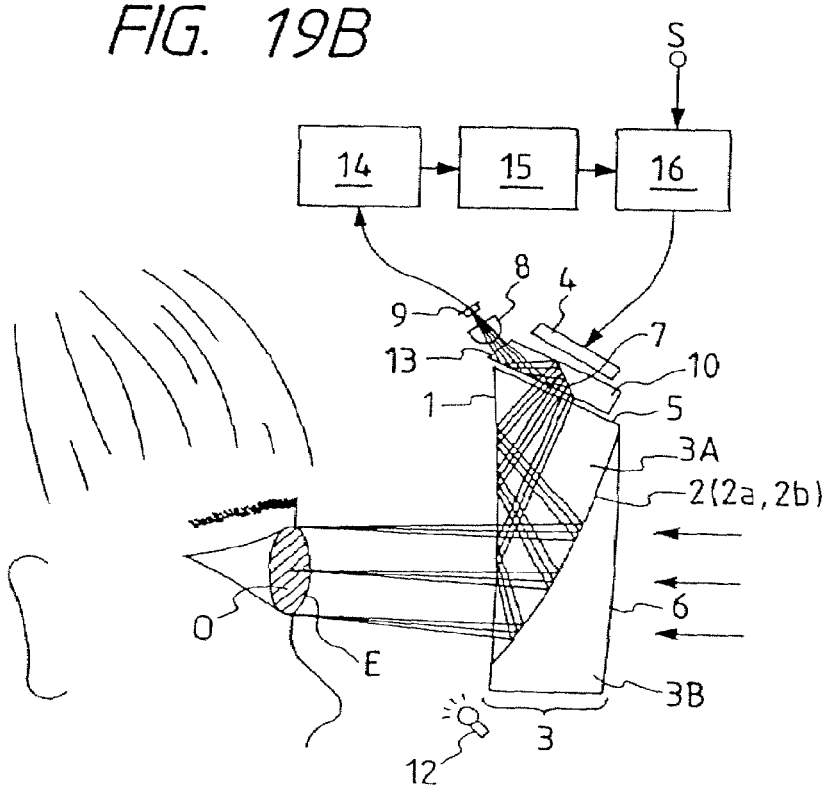

FIGS. 19A and 19B show the optical paths respectively of the observation system and the visual line detecting system in the optical system of the present invention.

Display means 4 displays, on a display face thereof, an image such as a character or a pattern, with visible light. A flat prism 10 is composed of two adhered prisms, of which the junction plane is provided with a dichroic mirror transmitting the visible light and reflecting the infrared light for visual line detection. The prism 10 has a lateral wall 13.

A first optical member 3A is provided with a flat face 5, a curved or aspherical face 1, and a half-transmitting or totally reflecting, spherical or aspherical face 2a of a positive refractive power. In the present embodiment, the face 2a is composed of a half mirror. A second optical member 3B is provided with a transparent or opaque, flat or curved face 6, and a concave face 2b, consisting of a half-transmitting or totally reflecting, spherical or aspherical surface same in shape as the face 2a. The face 2a of the first optical member 3A and the face 2b of the second optical member 3B are adhered to constitute a single prism block 3. The adhered face 2 constitutes a half mirror.

There are also provided an imaging lens 8 for visual line detection, an image sensor 9 consisting of a CCD, and a light source 12 for detecting the visual line of the eye E of the observer, by illuminating the frontal part of said eye E with invisible (infrared) light.

A visual line detecting circuit 14 detects the visual line information of the eye E. Discrimination means 15 discriminates whether the visual line of the observer is fixed for a predetermined time in a substantially same direction. Control means 16 receives image signals from an image information source S and displays an image on the display face of the display means 4 under controlled display state based on the visual line information from the discrimination means 15.

The prism 10 and the first optical member 3A constitute a part of the image observation optical system, and the image observation optical system and the second optical member 3B constitute a part of the observation optical system.

In the following there will be explained, with reference to FIG. 19A, the function of the observation optical system of the present embodiment. The control means 16 displays the image on the display face of the display means 4, based on the signals from the image information source S. The light beam (visible light beam) from the image displayed on the display means 4 is transmitted by the dichroic mirror 7 of the prism 10, then introduced into the prism block 3 through the face 5, totally reflected by the face 1, then reflected and condensed by the half mirror surface 2, and emerges from the face 1 to enter the pupil 0 of the observer. Thus a false image Y of the image displayed on the display means 4 is formed in front of the observer, and can be observed by the observer.

On the other hand, the light beam from the external scenery G is introduced into the face 6 of the prism block 3, then transmitted by the half mirror 2 and emerges from the face 1 to reach the pupil of the observer, who can thus observe the external scenery. Thus the observer observes, within a same viewing field, the false image Y of the image displayed on the display means 4 and the external scenery in superposition.

In the following there will be explained the function of the visual line detecting optical system of the present embodiment. Referring to FIG. 17B, the light reflected and scattered by the frontal part of the eye E of the observer, illuminated by the infrared light from the light source 12, is introduced into the face 1 of the prism block 3, then reflected by the half mirror 2 toward the face 1, then totally reflected by the face 1 and emerges from the face 5 to enter the prism 10. It is then reflected by the dichroic mirror 7, totally reflected by the lower face of the prism 10 and emerges from the face 13. It is then transmitted by the imaging lens 8 for visual line detection, thereby forming an image of the frontal part of the eye on the image sensor 9. The light reflected by the cornea of the eye E forms Purkinje's images, while the light scattered by the pupil forms an image of the pupil. The visual line detecting circuit 14 calculates the direction of the visual line of the observer, based on the Purkinje's images and the pupil image obtained from the image sensor 9. This detection can be achieved for example by a method disclosed in the Japanese Patent Laid-Open Application No. 3-109029 of the present applicant.

The light source 12, the first optical member 3A, the prism 10, the imaging lens 8, the image sensor 9 and the visual line detecting circuit 13 constitute a part of the visual line detecting means.

Figure 20:
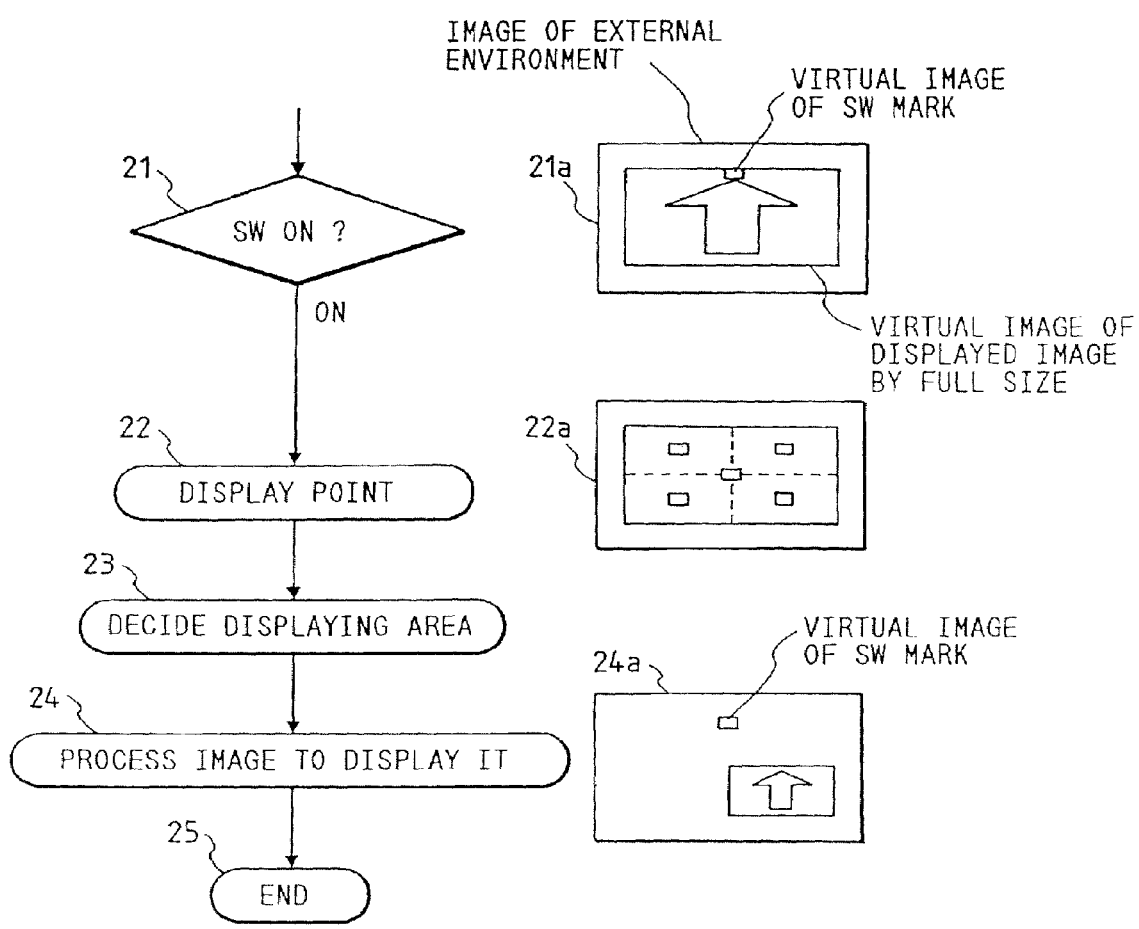
FIG. 20 is a flow chart showing the control sequence of the present invention.

FIG. 20 is a flow chart showing the control sequence of the present invention, for arbitrarily and selectively varying the size and position of the false image of the displayed image, to be superimposed with the external image, by the control means 16 of the present invention according to the visual line information of the eye E of the observer.

Figure 21:
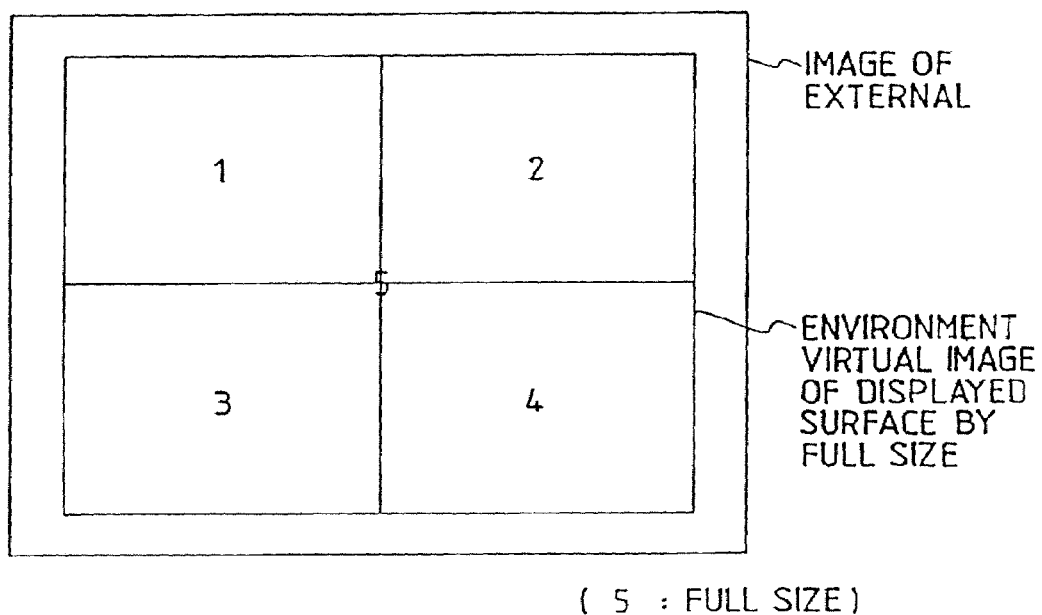
FIG. 21 is a schematic view showing selectable display areas in the present invention.

FIG. 21 is a schematic view of display areas, i.e. size and position of the display, selectable in the image display on the display means 4. In this embodiment there are selectable five display areas 1 to 5, in which 1 to 4 respectively correspond to rectangular areas, each equal to ¼ of the display face, while 5 corresponds to the full display face.

In the following there will be explained the steps of the flow chart. The drawings at the right indicate the images provided to the observer at the respective steps.

In the present embodiment, the direction of the visual line of the observer is constantly detected.

Step 21: Turns on a switch for activating the function of the present invention. For this purpose, a switch mark is displayed, at a predetermined position within the display face, during the ordinary image observation, and, if the observer watches the false image of the switch mark for a predetermined time, the visual line detecting means and the discrimination means 15 detect such watching state and initiate a switching operation of the displayed image in the following sequence:

(1) The visual line detecting means detects the direction watched by the observer.

If the position of the visual line coincides with the switch mark or the vicinity thereof, the discrimination means 15 stores the direction of the visual line, as first visual line information, in a memory, and the sequence proceeds to (2).

If the detected direction does not coincide with the switch mark, the discrimination means identifies that the observer does not wish to switch the displayed image, so that the sequence does not proceed to (2).

(2) After the lapse of a predetermined time, the discrimination means 15 detects, by the visual line detecting means, the direction watched by the observer.

If the detected direction coincides with the switch mark, the discrimination means 15 judges that the observer has watched the switch mark for the predetermined time, and sends a signal to the control means 16 to turn on the switch. Then the sequence proceeds to a step 22.

On the other hand, if the detected direction does not coincide with the switch mark, the sequence returns to (1).

By repeating the above-explained steps, the switching operation for the displayed image is securely started when the observer watches the switch mark for the predetermined time.

Figure 22:
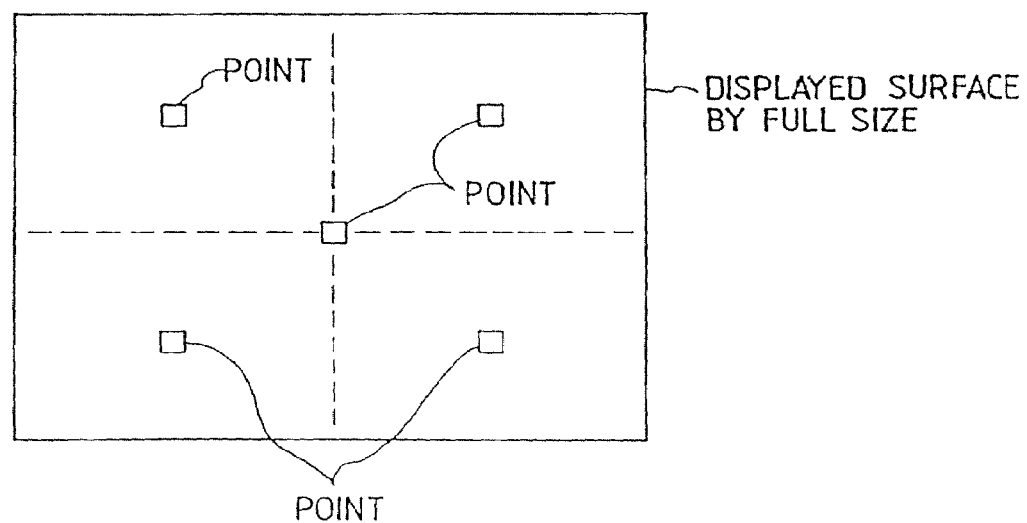
FIG. 22 is a schematic view showing points for display area selection in the present invention.

Step 22: When the switch is turned on, the control means 16 displays, for example, five points shown in FIG. 22, on the display face of the display means 4. Thus the observer sees an image 22a in FIG. 20.

Step 23: Determines the display area. The observer watches a point, representing the desired display area, for a predetermined time, and the visual line detecting means and the discrimination means 15 identifies the point watched by the observer for the predetermined time, within the image 22a, in the following sequence:

(1) The visual line detecting means detects the direction watched by the observer, and the discrimination means 15 identifies whether the detected direction coincides with any of the five points. If the detected direction coincides with any of the points, the detected direction or position is stored, as first visual line information, in a memory.

If the detected direction does not coincide with any of the points, the detection of the visual line is continued until the visual line is detected to any of the points.

(2) After the lapse of a predetermined time, the discrimination means 15 detects, by the visual line detecting means, the direction watched by the observer, and obtains second visual line information.

(3) The discrimination means 15 compares the detected direction of visual line with that corresponding to the point stored in the memory.

If two directions mutually coincide, the discrimination means judges that the point corresponding to the detected direction is the point desired by the observer for image display and sends the corresponding information to the control means 16, and the sequence proceeds to a step 24.

If the two directions do not mutually coincide, the sequence returns to (1).

The point watched by the observer is determined by repeating the above-explained steps.

In this manner, when the observer watches a point for a predetermined time, a display area is uniquely determined corresponding to said point.

Step 24: The control means 16 displays an image in the display area determined in the step 23, by varying the size and position of the display of the image, by applying suitable image processing to the image information. For example, if the point 5 shown in FIG. 21 is selected, the image is displayed in full size of the display face. If the point 4 is selected, the image size is changed to ¼ of the display face and is displayed at the lower right part thereof, as shown in 24a. However the switch mark is separately displayed anew.

The switching of the displayed image is thus completed.

In the present embodiment, as explained in the foregoing, the size and position of the false image of the displayed image to be superimposed can be varied, in the course of image observation and according to the situation of the external image, by merely directing the visual line of the observer to a specified position within the viewing field, without any manual operation, so that there is attained extremely satisfactory operability. Besides, in the present embodiment, the entire device can be compactized by partial common use of the image observation optical system for observing the displayed image and the visual line detecting optical system for visual line detection.

In the foregoing embodiment the display area can be selected in five manners, but it is also possible to further increase the freedom of selection available to the observer.

Also the switch turn-on operation may be conducted manually.

Figure 23A:
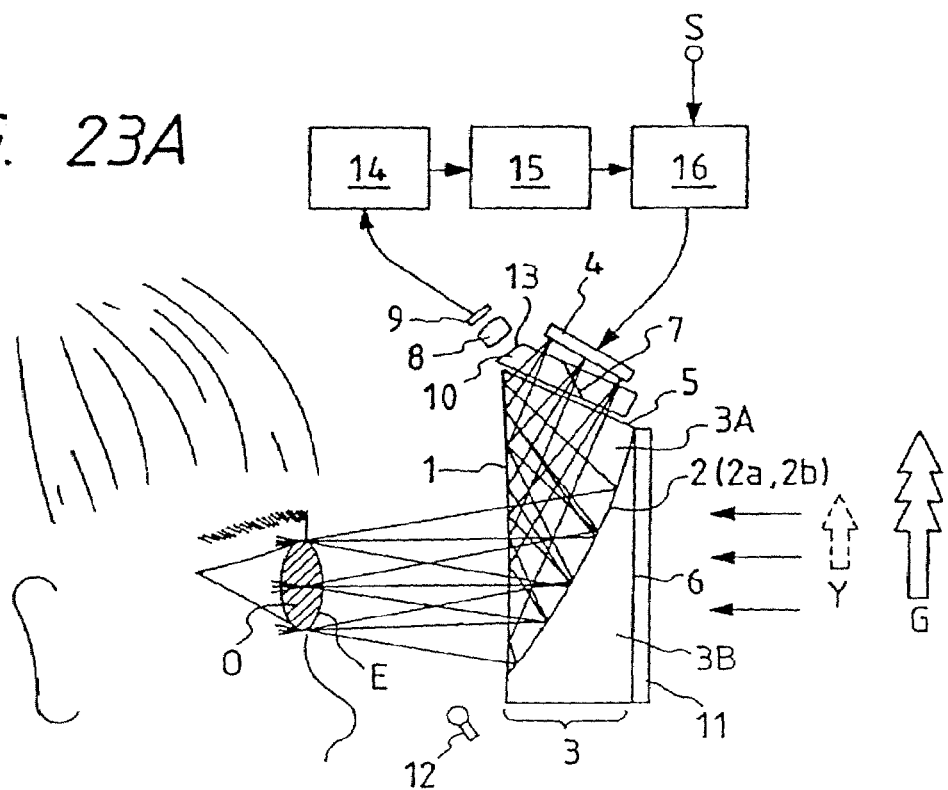
FIGS. 23A and 23B are partial schematic views of an observation optical system and a visual axis detecting optical system, respectively, of the present invention.
Figure 23B:
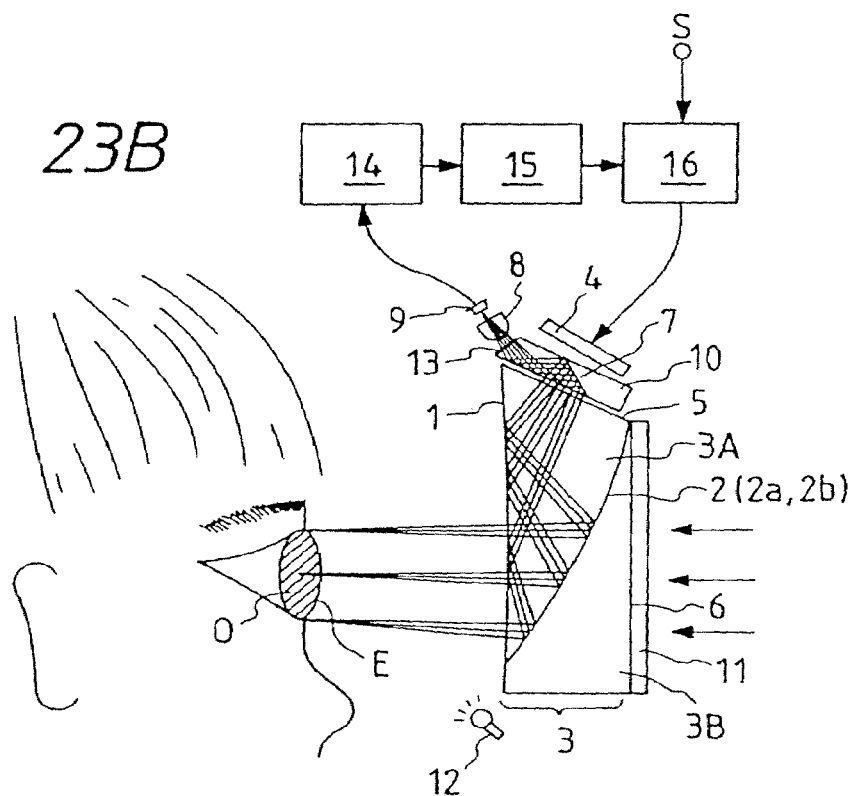

FIGS. 23A and 23B are respectively schematic views showing optical paths in an observation optical system and a visual line detecting optical system in another optical system of the present invention, wherein components same as those in FIGS. 19A and 19B are represented by same numbers.

The present embodiment is different from that shown in FIGS. 19A and 19B in that a transmissive liquid crystal device (shield member) 11 is provided outside the face 6 of the second optical member in order to intercept the light beam, or a part thereof, entering the prism block 3 from the outside. Such interception of the incoming light eliminates the overlapping of the external image with the false image Y of the displayed image, thereby enabling clear observation of the latter.

The prism 10, the first optical member 3A etc. constitute a part of the image observation optical system, while the image observation optical system, the second optical member 3B and the liquid crystal device 11 constitute a part of the observation optical system. Also the light source 12, the first optical member 3A, the prism 10, the imaging lens 8, the image sensor 9 and the visual line detecting circuit 14 constitute a part of the visual line detecting means.

The function of displayed image observation by the image observation optical system and that of the visual line detecting optical system in the present embodiment are same as that in the foregoing embodiment shown in FIGS. 19A and 19B.

Figure 24:
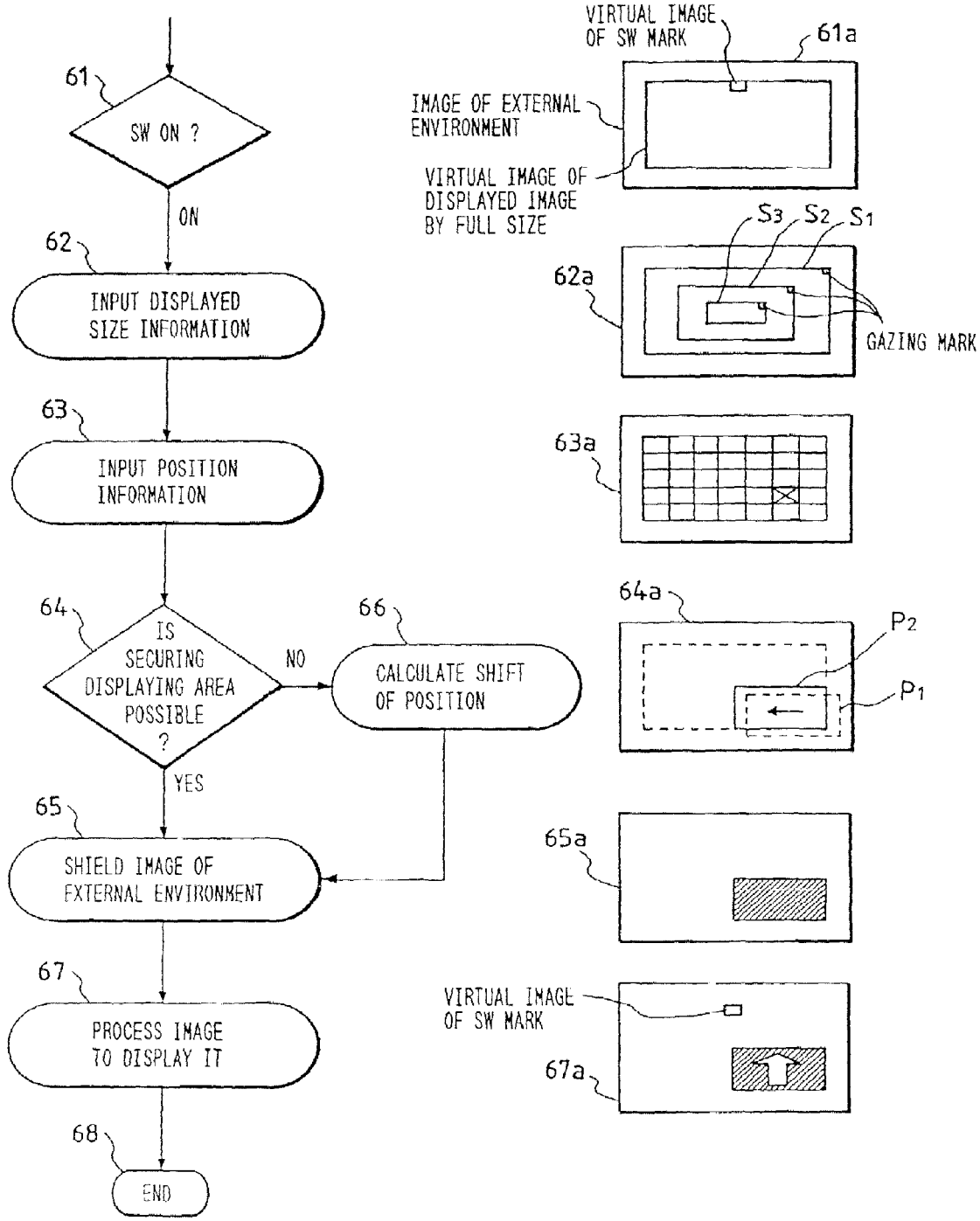
FIG. 24 is a flow chart showing the control sequence of the present invention.

In the following there will be explained the control sequence of the present embodiment, with reference to a flow chart shown in FIG. 24. The drawings at the right-hand side of the flow chart schematically illustrate the images provided to the observer in the respective steps.

In the present embodiment, the direction of visual line of the observer is constantly detected.

Step 61: Turns on a switch for activating the function of the present invention. As in the foregoing embodiment, when the observer watches, for a predetermined time, a false image of a switch mark displayed as a spot in a part of the displayed image, superimposed with the external image, the visual line detecting means and the discrimination means 15 detect such watching state and initiate a switching operation of the displayed image.

Step 62: Enters the display size information of the displayed image. The control means 16 displays, for example, a false image of a displayed image 62a, for observation by the observer. Said image includes, for example, a full-sized rectangular display frame S1, a rectangular frame S2 which is ½ in size in the vertical and horizontal directions, and a rectangular frame S3 which is ¼ in size.

Each display frame has a watching mark at a corner (upper right corner in the illustrated example). When the observer watches, for a predetermined time, the watching mark belonging to a desired frame, the visual line detecting means and the discrimination means 15 detect such watching state and judge that the observer has selected the corresponding display size, whereupon the display size is determined and the corresponding information is supplied to the control means 16. (The sequence for this operation is similar to that already explained in the step 23 of the foregoing embodiment.) Such selecting procedure from a limited number of display frames enables rapid setting of the display size, though fine adjustment of the display size is not possible. As an example, let us consider a case of selecting the frame S2.

Step 63: Enters the display position information of the displayed image. The control means 16 displays, for example, a false image of a displayed image 63a, in which the full-sized display face is divided into grating-patterned areas of a suitable number, in superposition with the external image. Then the observer watches, for a predetermined time, a desired image display position (for example marked with "x") in these areas. In response, the visual line detecting means and the discrimination means 15 determine the display position in the following sequence:

(1) The visual line detecting means detects the position watched by the observer in the grating pattern, and the discrimination means 15 stores the detected area number, as first visual line information, in a memory.

(2) After the lapse of a predetermined time, the discrimination means 15 detects, by the visual line detecting means, the position watched by the observer in the grating pattern, and the detected area number is taken as second visual line information.

(3) The discrimination means 15 compares thus detected area number with that stored in the memory.

If the two area numbers mutually coincide, the discrimination means 15 judges this area as the image display area desired by the observer, and sends the corresponding information to the control means 16. Then the sequence proceeds to a step 64.

If the two area numbers do not coincide each with other, the memorized area number is replaced by the newly detected area number, and the sequence returns to (2).

The display position desired by the observer is determined by repeating the above-explained steps. This procedure enables secure entry of the position information and avoids erroneous input, even if the visual line of the observer is somewhat shifted, as long as the observer watches the vicinity of the desired area for a predetermined time during the input state of the position information.

Step 64: The control means 16 discriminates whether the image of the designated size can be displayed around the display position designated by the observer.

If such display is possible, the display area is thus determined and the sequence proceeds to a step 65.

On the other hand, if the displayed image P1 around the designated position overflows the display face as indicated in 64a, the sequence proceeds to a step 66.

Step 66: Effects calculation for shifting the display position of the displayed image P1, for determining a display area P2, allowing to retain the designated size of the image P1 with a minimum shift of the display position.

Step 65: The control means 16 shifts the transmittance of the liquid crystal device 11 to zero in the image overlapping portion as indicated in 65a, thereby shielding the external image in said portion and avoiding the interference of the external image with the false image of thus determined display image.

Step 67: The control means 16 displays the image in the display area determined in the steps 64 and 66, by varying the size and position of display of the image by applying suitable image processing to the image information. The switch mark is displayed separately from the overlapping area.

The switching of the displayed image is thus completed.

In the present embodiment, as explained in the foregoing, the size and position of the false image of the displayed image to be superimposed can be varied, in the course of image observation and according to the situation of the external image, by merely directing the visual line of the observer to a specified position within the viewing field, and the external image in the superimposed portion is suitably shielded by a shield member. Thus there is attained an observation optical device, featured by extremely satisfactory operability, not requiring any manual operation for varying the displayed image, and allowing clear observation of the false image Y of the displayed image.

The display size may also be entered for example by displaying a linear pattern, of which an end corresponds to the full-sized image frame while the other end corresponds to the ¼-sized image frame, and judging the display size desired by the observer in analog manner, based on the position watched by the observer on the linear pattern. In this manner the observer can enter, in considerably precise manner, the proportion of display size with respect to the maximum display size.

In the present embodiment, a grating pattern is displayed at the entry of the display position, but such grating pattern display may be dispensed with.

Based on the above-explained configuration, the present invention provides an observation optical device of excellent operability capable of arbitrarily varying the size and position of display of the false image for observation of the image displayed on the display face, in the course of observation of such false image or of observation of such false image spatially overlapped with the external image, to specified positions within the viewing field, according to the wish of the observer or to the external situation, utilizing the visual line of the observer.

Furthermore there is provided an observation optical device capable of shielding a part of the external image where the false image of the displayed image is overlapped, thereby enabling extremely clear observation of such false image.

What is claimed is:

1. A display apparatus comprising:
   display means for forming image information; and
   optical means for guiding light of said display means to an eye, said optical means including a concave mirror decentered with respect to an optical axis of the eye and having different optical powers according to an azimuth angle and another surface decentered with respect to the optical axis of the eye and having different optical powers according to an azimuth angle,
   wherein when a paraxial curvature radius of a generatrix section of said concave mirror and a paraxial curvature radius of a meridian section of said concave mirror are respectively defined by $r_y$ and $r_x$, the relationship of $|r_x|<|r_y|$ is satisfied.

2. An apparatus according to claim 1, wherein a surface of said concave mirror and said another surface have optical powers having mutually different positive or negative power on a section of a meridian of each said surface.

3. An apparatus according to claim 2, wherein said optical means comprises an eyepiece optical system for directly magnifying the image information from said display means.

4. An apparatus according to claim 1, further comprising:
   illumination means for illuminating the eye; and
   light-receiving means for receiving the light reflected from the eye to detect the visual line thereof.

* * * * *